United States Patent [19]

Kreitman et al.

[11] Patent Number: 5,491,517
[45] Date of Patent: Feb. 13, 1996

[54] SYSTEM FOR IMPLANTING AN IMAGE INTO A VIDEO STREAM

[75] Inventors: Haim Kreitman, Kfar Saba; Dan Bar-El, Herzlia; Yoel Amir, Kfar Saba; Ehud Tirosh, Tel Aviv, all of Israel

[73] Assignee: Scitex America Corporation, Bedford, Mass.

[21] Appl. No.: 375,464

[22] Filed: Jan. 19, 1995

[30] Foreign Application Priority Data

Mar. 14, 1994 [IL] Israel .......................................... 108957

[51] Int. Cl.⁶ ........................... H04N 5/265; H04N 5/275
[52] U.S. Cl. ........................ 348/581; 348/586; 348/599; 348/722
[58] Field of Search ..................... 348/578, 580, 348/581, 582, 584, 585, 586, 587, 590, 591, 592, 596, 598, 599, 722; 345/139; H04N 5/262, 5/265, 5/272, 5/275

[56] References Cited

U.S. PATENT DOCUMENTS

| | | | |
|---|---|---|---|
| 4,806,924 | 2/1989 | Giraud et al. | 340/792 |
| 4,907,086 | 3/1990 | Truong | 358/183 |
| 4,947,256 | 8/1990 | Wood et al. | 358/183 |
| 4,956,706 | 9/1990 | Ohba | 348/578 |
| 4,967,276 | 10/1990 | Murakami et al. | 358/183 |
| 5,099,331 | 3/1992 | Truong | 358/183 |
| 5,107,252 | 4/1992 | Traynar et al. | 348/580 X |
| 5,264,933 | 11/1993 | Rosser et al. | 348/564 |
| 5,353,392 | 10/1994 | Luquet et al. | 348/578 X |

FOREIGN PATENT DOCUMENTS

| | | |
|---|---|---|
| 103002/2 | 8/1992 | Israel . |
| WO91/00296 | 1/1991 | WIPO . |

OTHER PUBLICATIONS

R. Michael Hord, *Digital Image Processing of Remotely Sensed Data*, Academic Press, 1982.

Rosenfeld, et al., *Digital Picture Processing, volume 2*, Second Edition, Academic Press, 1982, pp. 121–126.

Berthold Klaus Paul Horn, *Robot Vision*, The MIT Press, 1986, pp. 258, 259 and 275.

Olivier Faugeras, *Three–Dimensional Computer Vision: A Geometric Viewpoint*, The MIT Press, 1993, Section 3.4.

*Primary Examiner*—Victor R. Kostak
*Assistant Examiner*—John W. Miller
*Attorney, Agent, or Firm*—Skjerven, Morrill, MacPherson, Franklin & Friel

[57] ABSTRACT

A system and method which mixes images, such as an advertisement, with a video stream of action occurring within a relatively unchanging space, such as a playing field, is disclosed. The system utilizes a model of the background space to change the video stream so as to include the image at some location within the background space. It includes a video frame grabber and an image implantation system. The frame grabber grabs a single frame of the video signal at one time. The image implantation system typically implants the grabbed image into the frame onto a predefined portion of a preselected one of the surfaces of the background space if the portion is shown in the frame. To determine the location of the portion to have implantation, the image implantation system includes a unit for receiving a) a flat model of the fixed surfaces and b) an image mask indicating the portion of the flat model onto which the image is to be mixed. Via the model, the image implantation system identifies if and where the portion is shown in the frame.

8 Claims, 28 Drawing Sheets

42

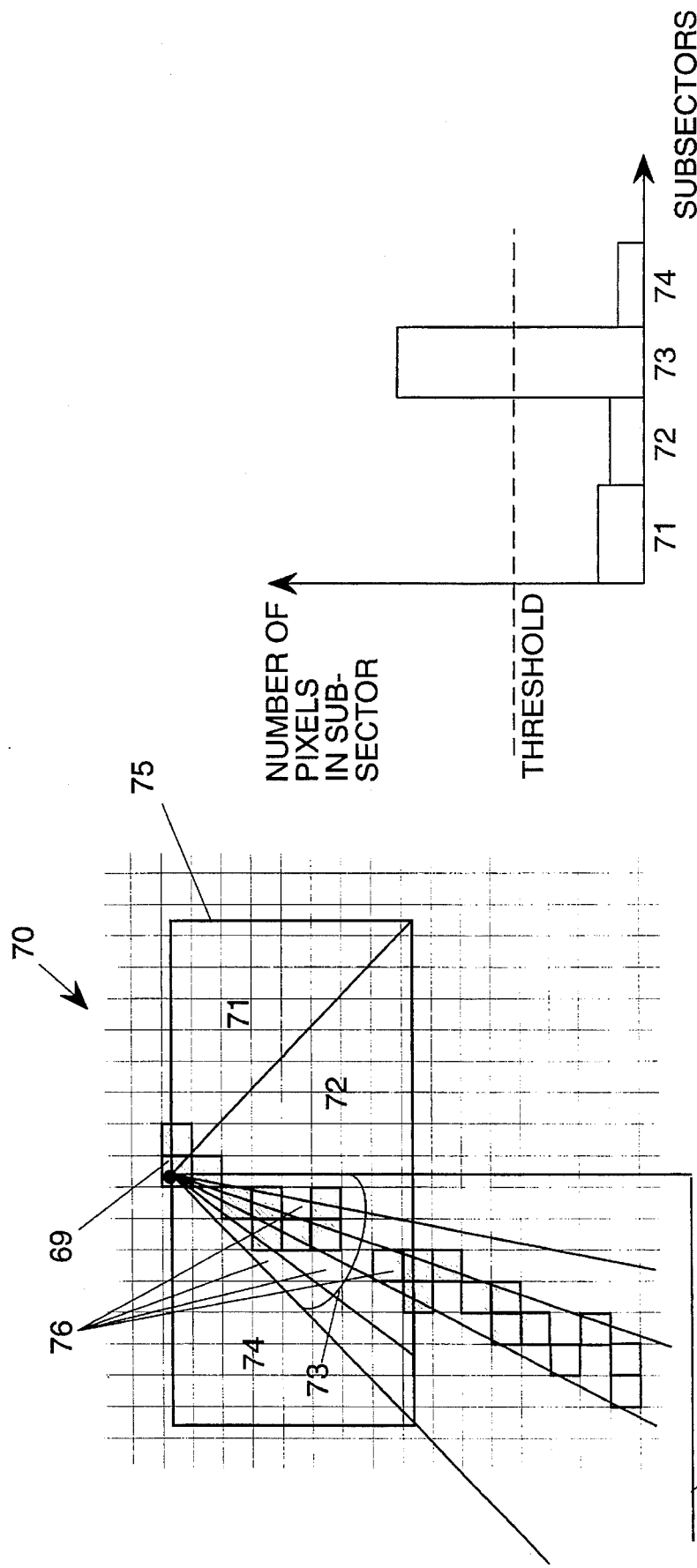

| CAMERA NO. | CONSTANT CAMERA COORDINATES | VARIABLE TURN, TILT ANGLES AND ZOOM | MATCHING COEFFICIENT (PCT) |
|---|---|---|---|
| 1 | X,Y,Z | $\alpha_1, \Theta_1, f_1$ | |
| 2 | | | |
| 3 | | | |
| | | | |
| N | | | |

FIG. 21

SYSTEM FOR IMPLANTING AN IMAGE INTO A VIDEO STREAM

FIELD OF THE INVENTION

The present invention relates generally to merging of a prepared image with a video signal.

BACKGROUND OF THE INVENTION

Sports arenas typically include a game area where the game occurs, a seating area where the spectators sit and a wall of some kind separating the two areas. Typically, the wall is at least partially covered with advertisements from the companies which sponsor the game. When the game is formed, the advertisements on the wall are filmed as part of the sports arena. The advertisements cannot be presented to the public at large unless they are filmed by the television cameras.

Systems are known which merge predefined advertisements onto surfaces in a video of a sports arena. One system has an operator define a target surface in the arena. The system then locks on the target surface and merges a predetermined advertisement with the portion of the video stream corresponding to the surface. When the camera ceases to look at the surface, the system loses the target surface and the operator has to indicate again which surface is to be utilized.

The above-described system operates in real-time. Other systems are known which perform essentially the same operation but not in real-time.

Other systems for merging data onto a video sequence are known. These include inserting an image between video scenes, superposition of image data at a fixed location of the television frame (such as of television station logos) and even electronic insertion of image data as a "replacement" of a specific targeted billboard. The latter is performed using techniques such as color keying.

U.S. Pat. No. 5,264,933 describes an apparatus and method of altering video images to enable the addition of advertising images to be part of the image originally displayed. The operator selects where in the captured image the advertising image is to be implanted. The system of U.S. Pat. No. 5,264,933 can also implant images, in selected main broadcasting areas, in response to audio signals, such as typical expressions of commentators.

PCT Application PCT/FR91/00296 describes a procedure and device for modifying a zone in successive images. The images show a non-deformable target zone which has register marks nearby. The system searches for the register marks and uses them to determine the location of the zone. A previously prepared image can then be superimposed on the zone. The register marks are any easily identifiable marks (such as crosses or other "graphemes") within or near the target zone. The system of PCT/FR91/00296 produces the captured image at many resolutions and utilizes the many resolutions in its identification process.

SUMMARY OF THE PRESENT INVENTION

It is an object of the present invention to provide a system and method which mix images, such as an advertisement, with a video stream of action occurring within a relatively unchanging space. Such a space may be a playing field or court, a stage or a room and the location is typically selected prior to the action (e.g. game or show). The images are "implanted" onto a selected surface of the background space, where the term "implanted" herein means that the images are mixed onto the part of the video stream showing the selected surface.

Specifically, the present invention utilizes apriori information regarding the background space to change the video stream so as to include the image at some location within the background space. The system and method operate no matter which perspective view of the background space is presented in the video stream.

In accordance with a preferred embodiment of the present invention, the system preferably includes a video frame grabber and an image implantation system. The frame gabber grabs a single frame of the video signal at one time. The image implantation system typically implants the advertising image into the frame onto a predefined portion of a preselected one of the surfaces of the background space if the portion is shown in the frame. To determine the location of the portion to receive the implantation, the image implantation system includes a unit for receiving a) a flat model of the fixed surfaces of the background space and b) an image mask indicating the portion of the fiat model onto which the image is to be mixed. Via the model, the image implantation system identifies if and where the portion is shown in the frame.

Moreover, in accordance with a preferred embodiment of the present invention, the system also includes a design workstation on which the image and an image mask which indicates the preselected surface can be designed.

Further, the identification preferably involves a) reviewing the frame and extracting features of the fixed surfaces therefrom and b) determining a perspective transformation between the model and the extracted features.

Still further, the reviewing and extracting includes creating a background mask and a foreground mask. The background mask indicates the locations of features of interest, of background elements in the frame and is utilized to extract desired features. The foreground mask is formed of the foreground elements of the frame which must remain unchanged.

Additionally, in accordance with a preferred embodiment of the present invention, the implantation includes the steps of a) transforming the image, an image mask and, optionally, a blending mask, with the perspective transformation, and b) mixing the transformed image, image mask and optional blending mask with the frame and with the foreground mask. The foreground mask, as mentioned hereinabove, indicates locations of foreground data not to be covered by the transformed image.

Further, the system preferably includes a lookup table for convening between the multiplicity of colors in the frame to one of: colors of features of interest, colors of background elements and a color indicating foreground elements. The lookup table is preferably created by having a user indicate the relevant colors. If the relevant colors no longer indicate the features of interest and the background elements (typically due to fighting changes), the user can indicate new colors which do indicate the desired elements and the lookup table is then corrected.

Still further, in accordance with a preferred embodiment of the present invention, the lookup table is utilized to create the background and foreground masks of the frame indicating the locations of features of interest, of background elements and of foreground elements in the frame.

In accordance with an exemplary embodiment of the present invention, the features are lines. In one embodiment, they are extracted with a Hough transform. In another embodiment, they are extracted by determining the angles of line segments. Pixels of interest are selected and a neighborhood opened. The neighborhood is subdivided and the sector having the greatest activity is selected. The selected sector is then extended and divided. The process is repeated as necessary.

Moreover, in accordance with a preferred embodiment of the present invention, the system projects the extracted features onto an asymptotic function to determine which of the features are perspective versions of parallel lines.

Further, in accordance with the exemplary embodiment of the present invention, the background space is a sports arena having lines marked on it. The system has a model of the sports arena and, preferably, has a list of the rectangles in the model and the locations of their corner points. The system preferably perform the following operations:

a) selects two vertical and two horizontal lines from the extracted features and determines their intersection points;

b) generates a transformation matrix from the corner points of each rectangle of the model to the feature intersection points;

c) transforms the model with each transformation matrix;

d) utilizing the background elements of the background mask, matches each transformed model with the frame; and e) selects the transformation matrix which matches the features of the frame best.

Moreover, in accordance with the exemplary embodiment of the present invention, camera parameters can be utilized to reduce the number of lines in the frame needed to identify the sports field. For this embodiment, the following actions occur:

receiving or extracting the coordinates of a set of cameras; representing a current transformation matrix as a product of coordinate, tilt, turn and zoom matrices and then determining the values for the tilt, turn and zoom; and identifying the camera having the calculated values for tilt, turn and zoom and storing the information; and repeating the steps of receiving, representing and identifying whenever there is a new cut in the video.

Any frame in the video stream can now be treated as either being similar to the previous frame or as part of a new cut taken by an identified camera.

BRIEF DESCRIPTION OF THE DRAWINGS

The present invention will be understood and appreciated more fully from the following detailed description taken in conjunction with the drawings in which:

FIG. 9B is an illustration of a portion of the background mask, useful in understanding the method of FIG. 9A;

FIG. 9C is an illustration of a histogram of subsectors of the background mask of FIG. 9B, useful in understanding the method of FIG. 9A;

FIG. 21 is an illustration of a table useful in the process shown in FIG. 20.

DETAILED DESCRIPTION OF PREFERRED EMBODIMENTS

Figure 1:
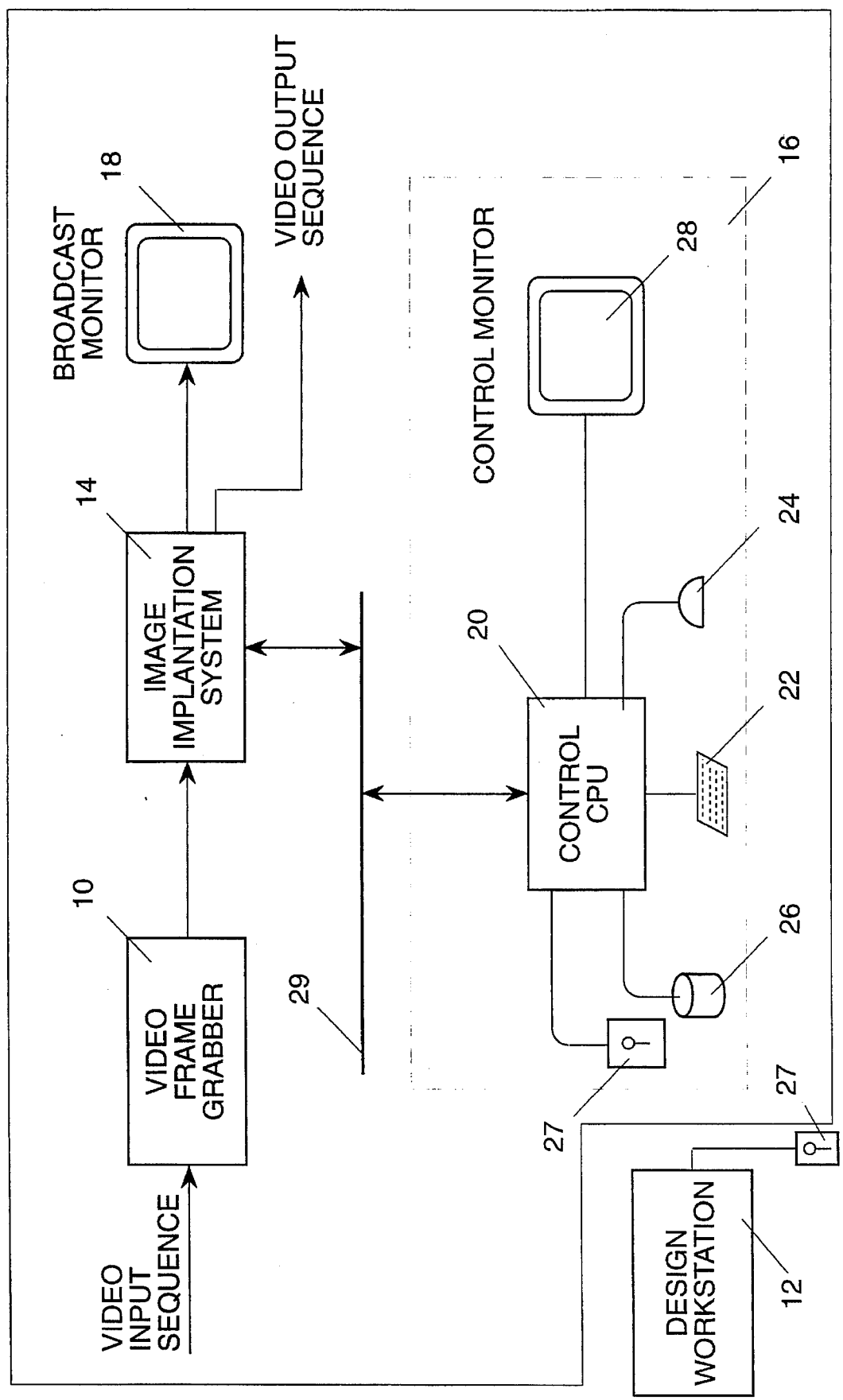
FIG. 1 is a block diagram illustration of a system for implanting images into a video stream, constructed and operative in accordance with a preferred embodiment of the present invention.

Reference is now made to FIG. 1 which illustrates a system for mixing images, such as advertisements, with a video stream of action occurring within a relatively unchanging background space. The images are implanted onto a selected surface of the background space. The system will be described in the context of a video of a tennis game, illustrated in FIG. 2 to which reference is also made. It will be understood that the present invention is operative for all situations in which the surfaces in which action occurs are known a priori and are identifiable.

The system of the present invention typically comprises a video frame grabber 10 for converting an input video sequence (such as of a tennis game) into video frames, a design workstation 12 for designing images (such as advertisements) to be implanted onto a selected surface (such as on the tennis court) seen within the video frame, an image implantation system 14 for merging the video frame with the designed image, a control computer system 16 for controlling the action of and providing operator input to the image implantation system 14 and a broadcast monitor 18.

The control computer system 16 typically comprises a central processing unit (CPU) 20, a keyboard 22, a mouse 24, a disk 26, a removable media drive such as a floppy 27, and a monitor 28. The monitor 28 is typically driven by a graphics adaptor forming part of the CPU 20. The design workstation 12 typically also includes a removable media drive such as floppy 27.

The control computer system 16 and the image implantation system 14 typically communicate via a system bus 29. The design workstation and the control computer system 16 typically communicate via removable media.

The video sequence can be received from any source, such as a videotape, a remote transmitting station via satellite, microwave or any other type of video communication, etc. If the sequence is provided from a satellite, the system has no control over the video rate. Therefore, the image implantation system 14 must perform its operations within the video rate, typically 30 ms between frames, of the satellite video stream if the sequence comes from a videotape, the system can control the video rate and operate at any desired speed.

Figure 2:
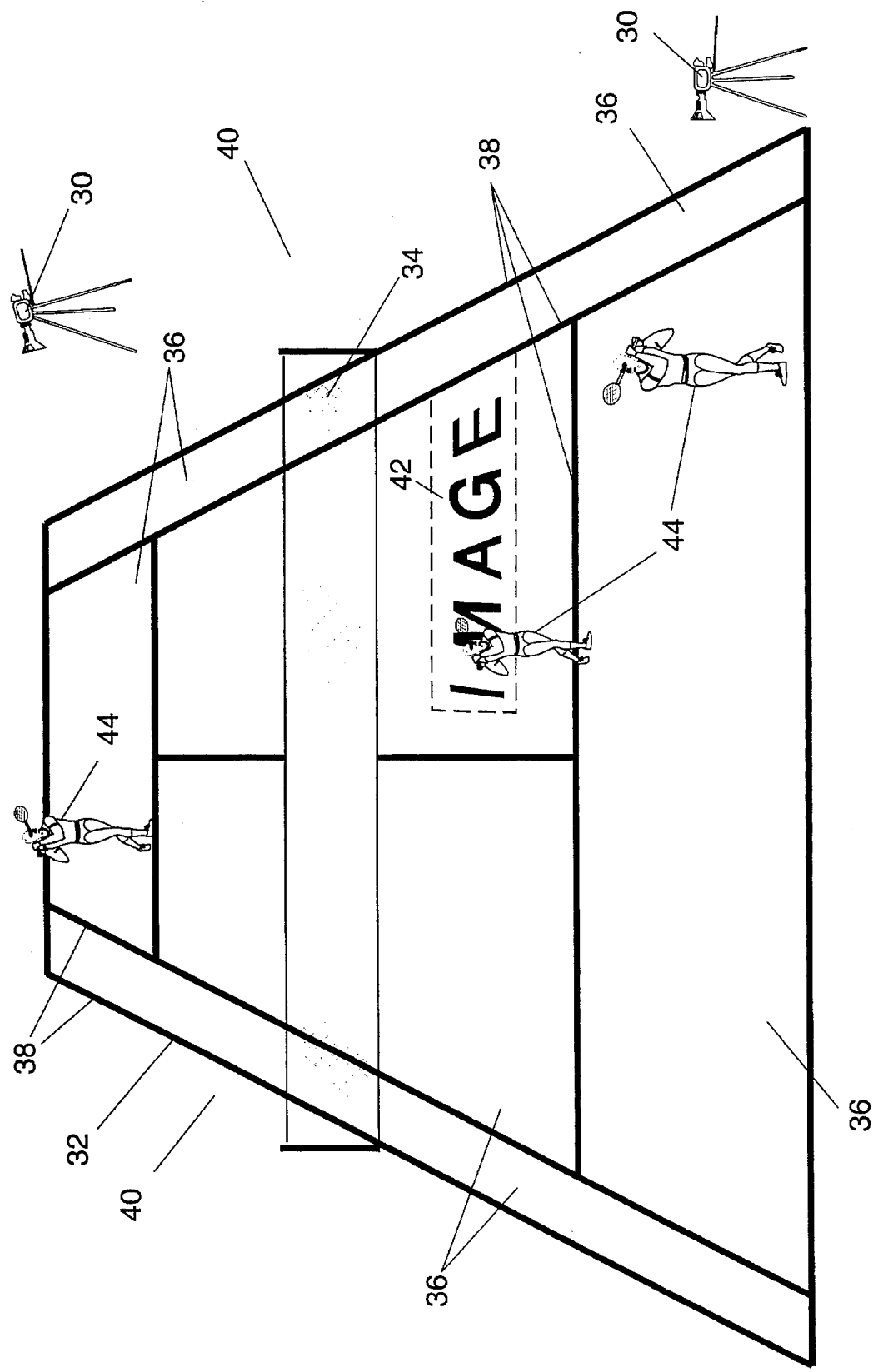
FIG. 2 is a schematic illustration of a tennis game used as an example for explaining the operation of the system of FIG. 1.

The video sequence is originally produced at the site of the game. As can be seen in FIG. 2, for tennis games, there are typically two television cameras 30 viewing the action on the tennis court 32. The locations of the television cameras 30 typically are fixed.

The court 32 is divided into two halves by a net 34. Each half has a plurality of areas 36, typically painted a first shade of green, divided by a plurality of lines 38, typically painted white. The outer court area 40 is typically painted a second shade of green.

In reality, the lines 38 are parallel and perpendicular lines. Since the cameras 30 zoom in on the action from an angle, rather than from above, the images of the action which they receive are perspective views. Thus, in the video output of the cameras 30, the parallel lines 38 appear as though they converge at infinity. The angle of perspective of the video output changes as the angles of the cameras 30 and the amount of zoom.

The present invention will implant an image 42, such as the word "IMAGE", at a desired location on a selected background surface, for all perspective angles and amount of zoom. For tennis courts, the possible locations are any rectangles within one haft of the tennis court 32 defined by four lines 38. As shown in FIG. 2, the image 42 will not interfere with the action of players 44; it will appear as though the image 42 was painted on the surface of the court.

Since, in reality, the shape of court 32 and the location of lines 38 within the court 32 do not change, if the image implantation system has a model of the playing space, including the location in which the image is to be implanted, and can identify at least the viewing angle and amount of zoom, it can merge the image into the video sequence so that it will appear as though the image was implanted at the desired location. To do this, the image implantation system additionally needs to know the colors of the court as seen by the cameras. These colors can change as the lighting (daylight or artificial) change.

Figure 3:
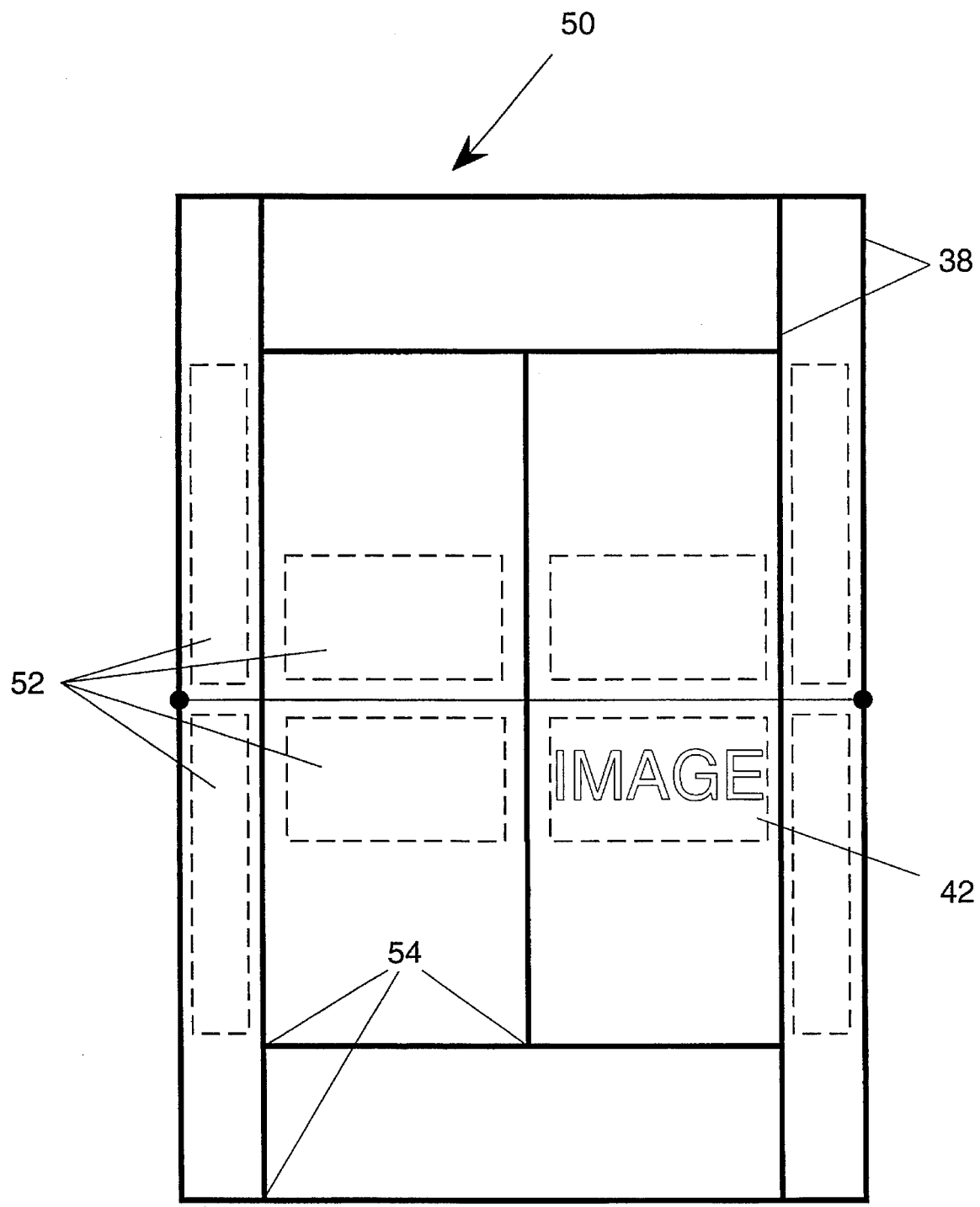
FIG. 3 is an illustration of a model of a tennis court, useful in understanding the operation of the system of FIG. 1.
Figure 4A:
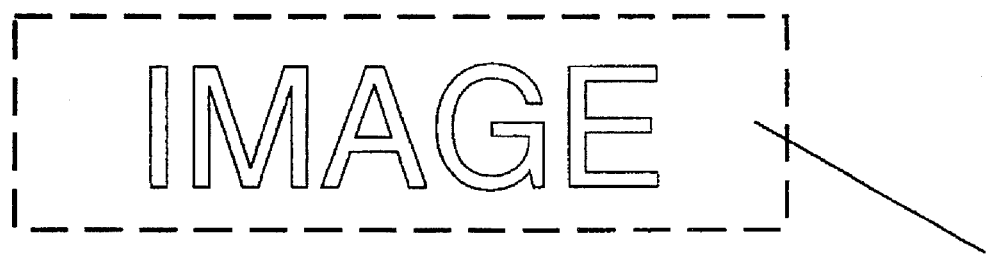
FIG. 4A is an illustration of an image to be implanted.
Figure 4B:
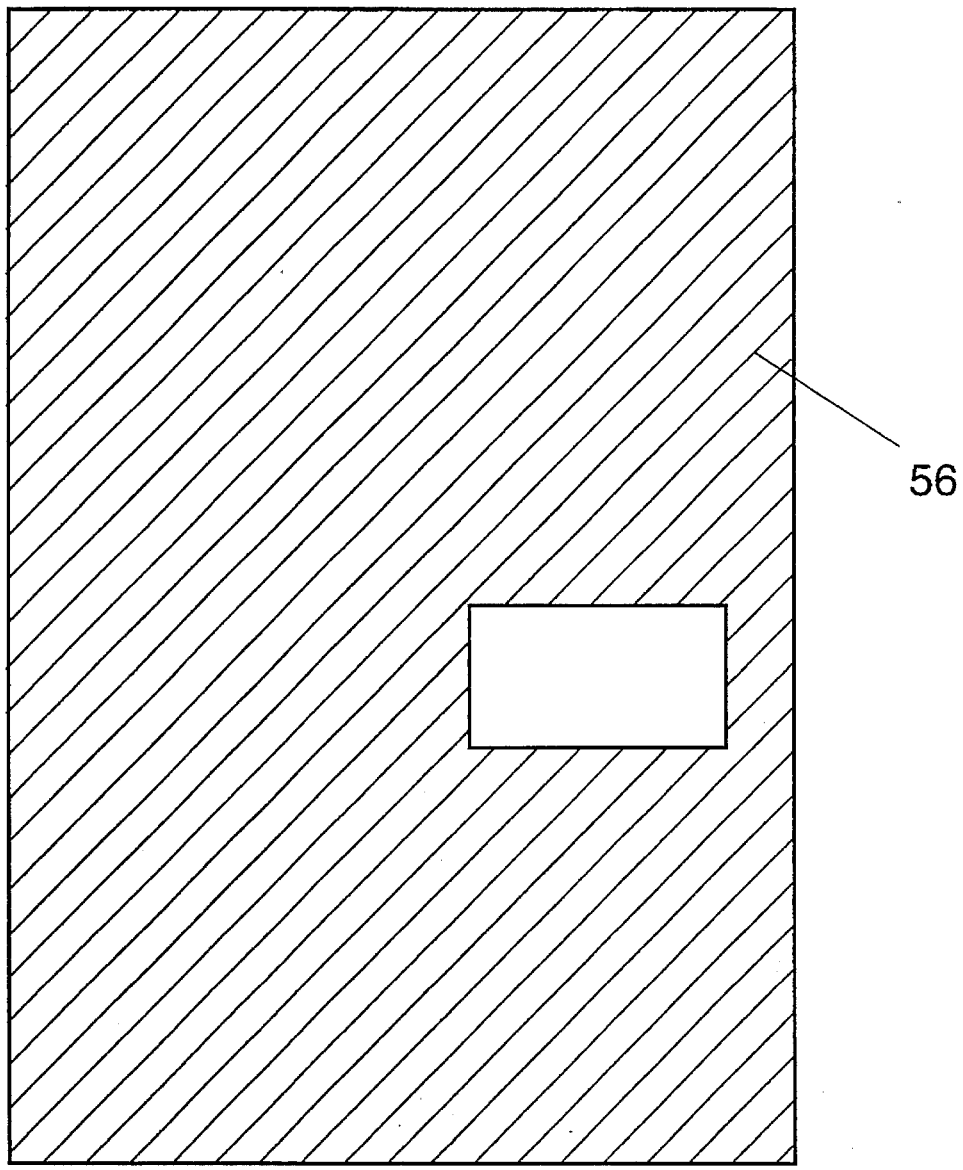
FIG. 4B is an illustration of an image region mask for the image of FIG. 4A and the model of FIG. 3.
Figure 4C:
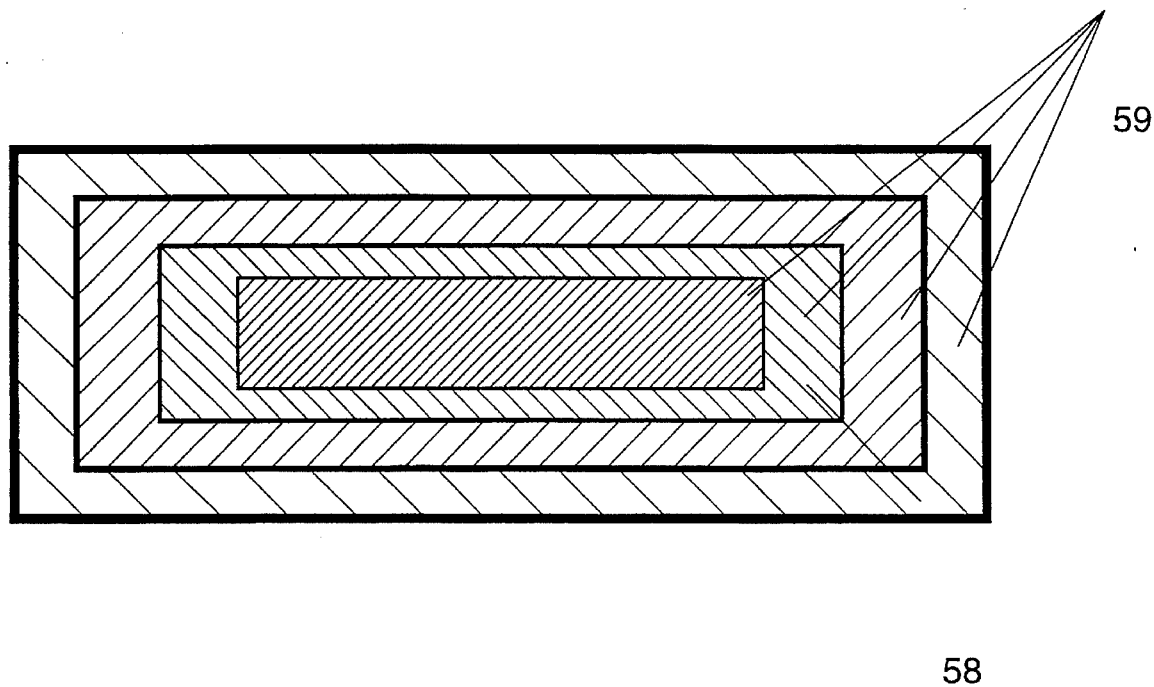
FIG. 4C is an illustration of a blending mask for the image of FIG. 4A and the model of FIG. 3.

Reference is now additionally made to FIG. 3 which illustrates a geometric model 50 of the tennis court and to FIGS. 4A, 4B and 4C which illustrate data which an implantation designer prepares.

The implantation designer works at the design workstation 12, such as the BLAZE workstation manufactured by Scitex Corporation Ltd. of Herzlia, Israel, and typically has the geometric model 50 of the tennis court 32, typically as a top view. The model 50 is typically a scaled version of the court 32, indicating the elements of it which are to be identified by the implantation system 14, such as the lines 38. Other playing fields may include circles or other well-defined curves. Other identifiable elements include intersections 54 of the lines 38.

The implantation designer designs the image 42 (illustrated in FIG. 4A) to be implanted and determines where on the model 50 to place it. A number of possible locations 52 are shown in FIG. 3. The designer then prepares an image location mask 56 (FIG. 4B) to identify where within the model 50 the image 42 is to be placed. The mask 56 is light at the location in model 50 where the image 42 is to be placed and dark everywhere else.

Since the image 42 may be of bright colors, it may be desired not to implant the image itself but a softened version of it, so as not to significantly disturb the action on the court 32. Therefore, the implantation designer may optionally prepare a blending mask 58 (FIG. 4C) indicating how the image 42 is to be blended with the color of the court 32 at the location of implantation as indicated by location mask 56. The blending mask 58 can be any suitable mask such as are known in the art. In FIG. 4C, mask 58 is shown to have four areas 59, each indicating the inclusion of a different amount of court color, where the outer area 59 typically incorporates much more of the court color than the inner areas.

Reference is now made back to FIGS. 1 and 2. The implantation data, formed of the geometric model 50, the image 42, the image location mask 56 and the optional blending mask 58, are typically prepared before the relevant tennis match and are provided to the image implantation system 14, typically via removable media, for implantation into the input video sequence when the match occurs.

Most video sequences of live televised games begin with an initializing sequence operative to enable local station operators to synchronize their systems to the input sequence. This is also typically true for taped video data.

In the present invention, the initializing video data is grabbed by the frame grabber 10 and is provided fast to the control computer system 16. A station operator selects a frame which has a clear view of the game field and uses it to provide calibration information, as described hereinbelow. The calibration information is utilized by the image implantation system 14 to identify the court 32 and its features (such as lines 38). In the embodiment described hereinbelow, the calibration information includes the colors of the features of interest in the background, such as the field lines, the playing field (court 32) and the ground outside the playing field (outer court area 40). The remaining colors which may be received are defined as foreground colors. Other playing fields may require fewer or more features to define them and thus, fewer or more colors.

The station operator, utilizing the mouse 24 and keyboard 22, interactively defines the calibration colors. This can be achieved in a number of ways, one of which will be described herein. A four color layer is superimposed over the frame currently displayed on control monitor 28. Initially, the four color layer is comprised of one color only, a transparent color. Thus, the current frame is initially visible.

The operator indicates pixels describing one of the three features, lines 38, inner playing field 36 and outer playing field 40. When he selects a pixel, those pixels in the superimposed layer which correspond to pixels in the current frame having the selected color are colored a single translated color, thereby covering their corresponding pixels of the current frame. The selected color is stored. The process is repeated for all three areas. All colors not selected are assigned a fourth translated color.

If the operator approves the resultant four color layer, a lookup table (LUT) between the colors selected from the current frame and the translated colors is produced.

Figure 18:
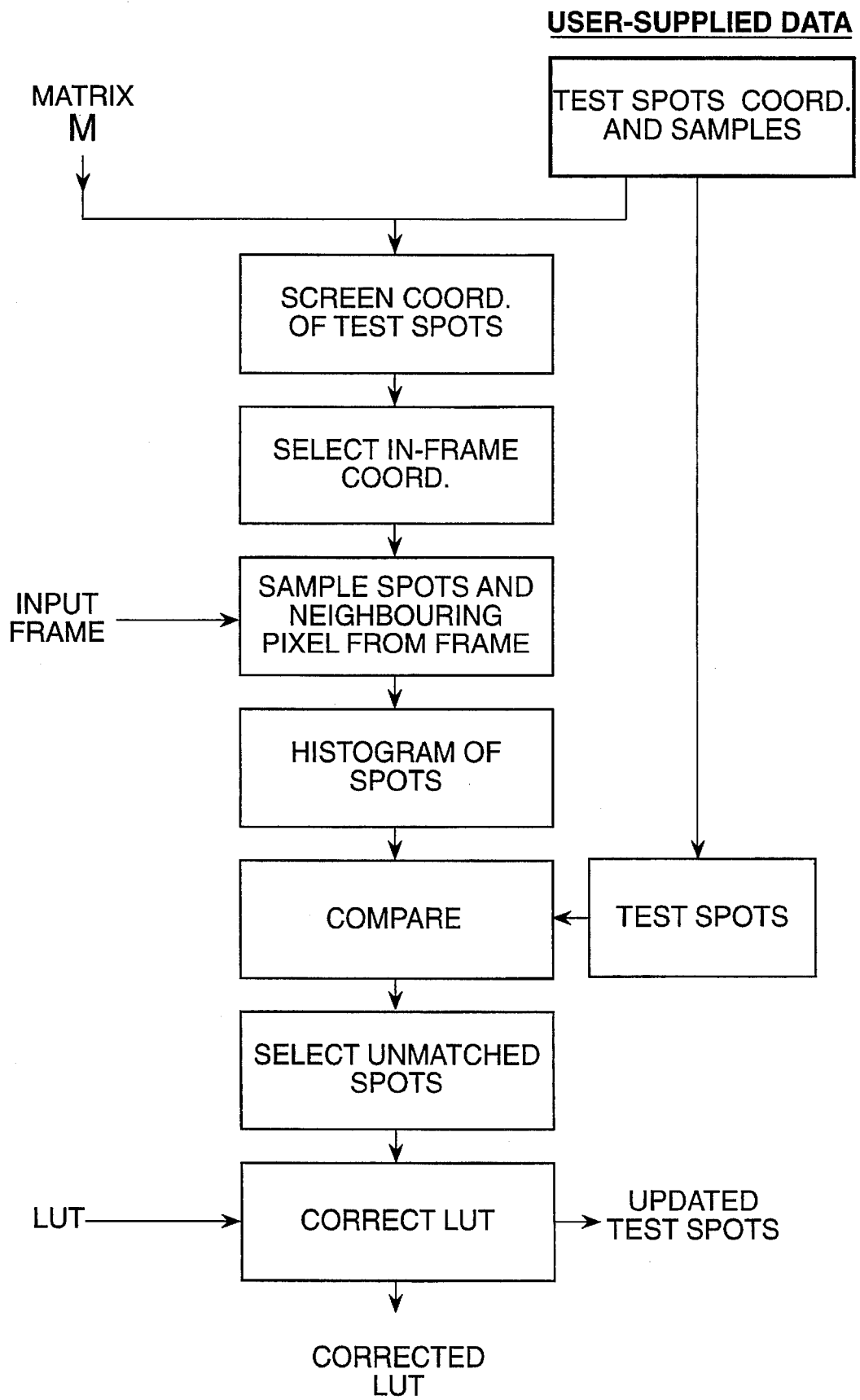
FIG. 18 is a block diagram illustration of a correction method for updating a lookup table used in the image implantation unit of FIG. 5.

If desired, the control computer system 16 can store the pixels which the operator selected for later use in a LUT correction cycle, described hereinbelow with reference to FIG. 18.

The control computer system 16 provides the frame data, consisting of the LUT and the pixels utilized to produce the LUT, to the image implantation system 14. System 14 utilizes the above described frame data to identify the desired features in each frame of the input video signal.

Figure 5:
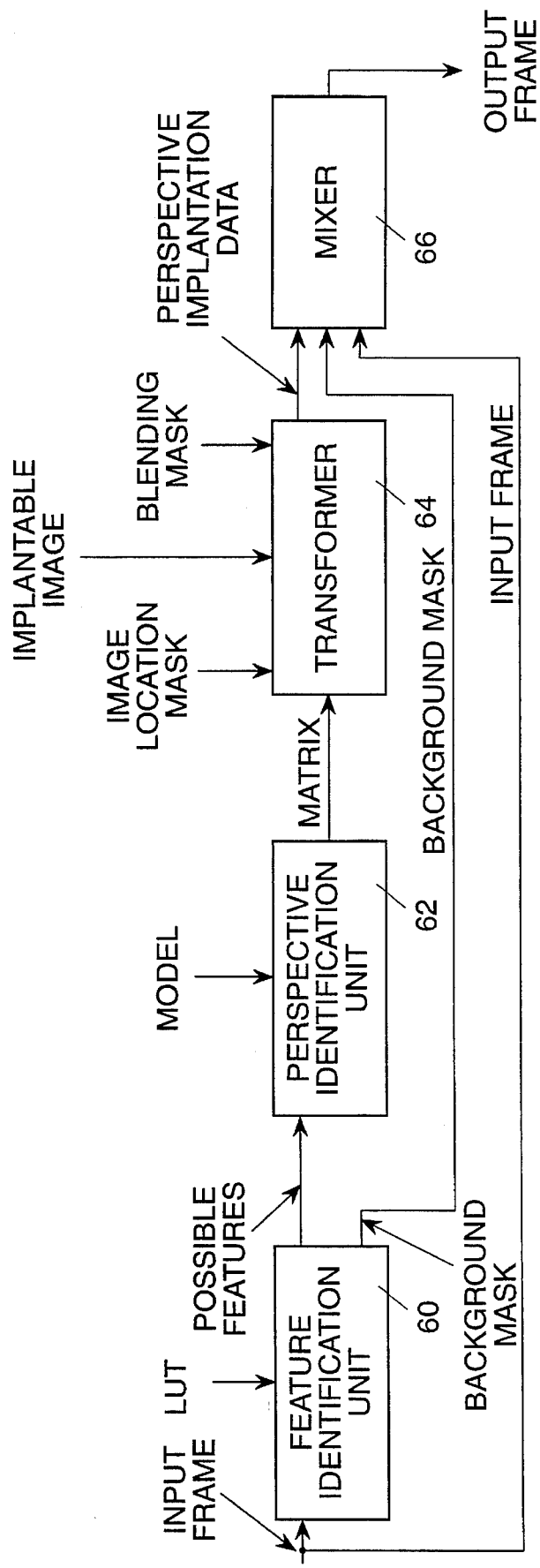
FIG. 5 is a block diagram illustration of elements of an image implantation unit forming part of the system of FIG. 1.
Figure 6:
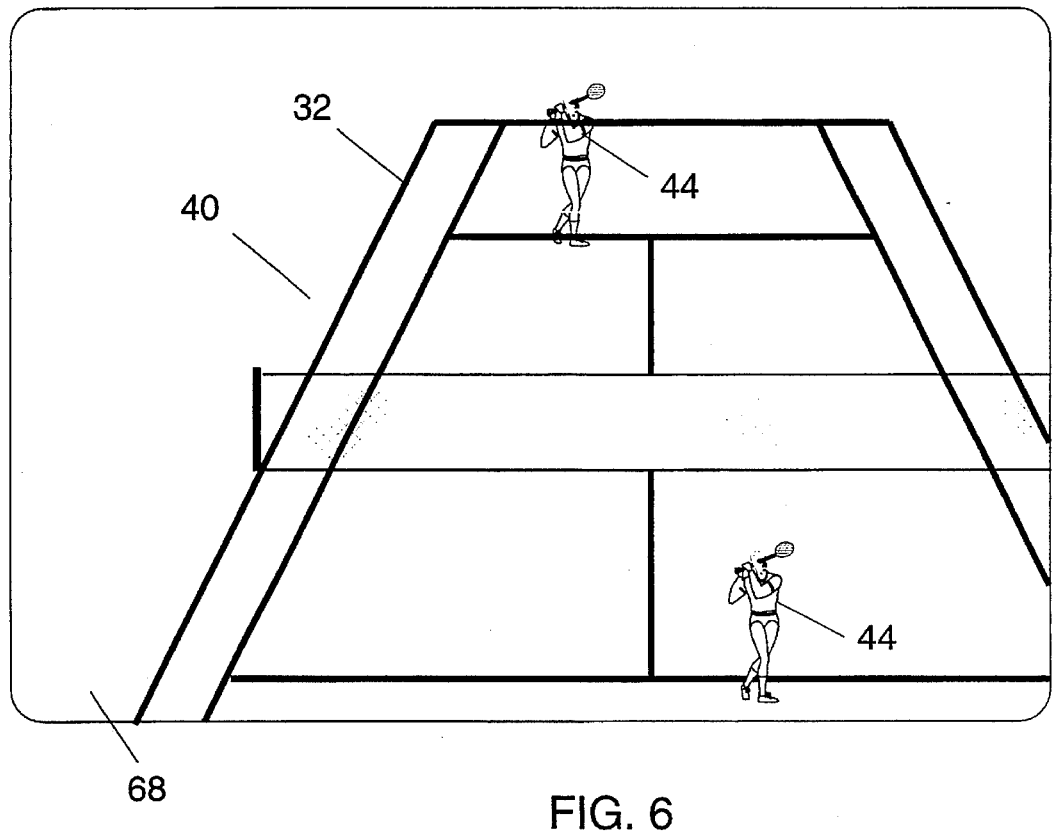
FIG. 6 is an illustration of an exemplary video frame into which the image of FIG. 4A is to be implanted.
Figure 7:
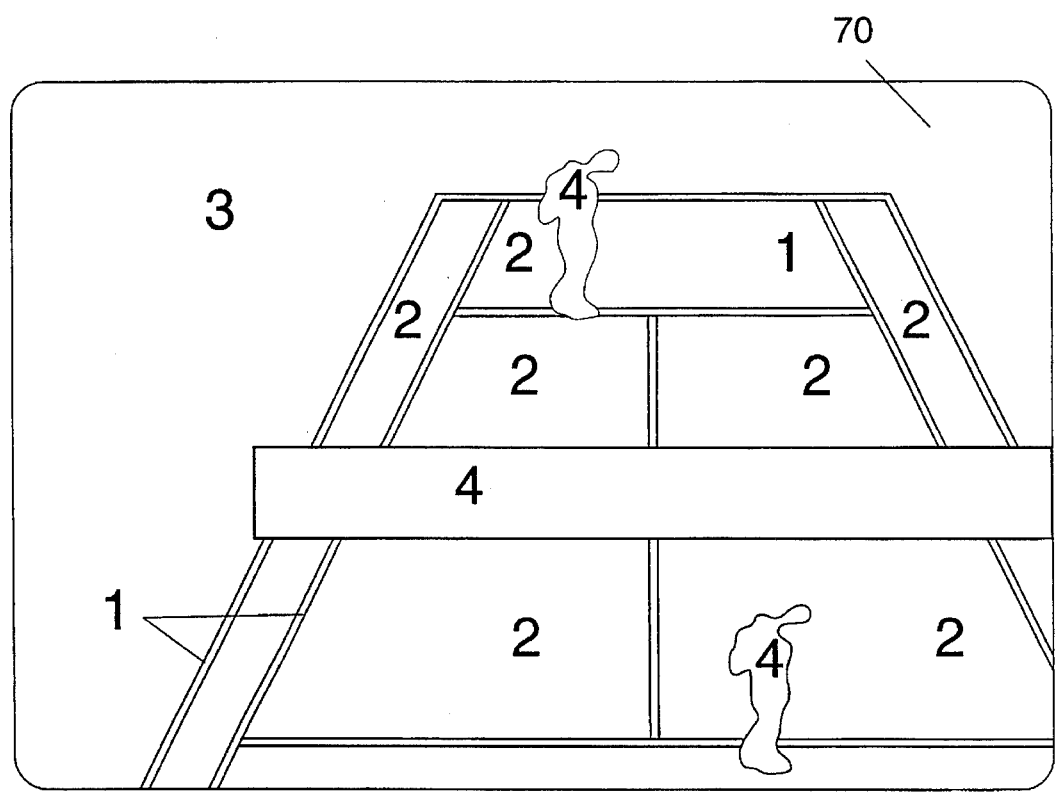
FIG. 7 is an illustration of a background mask generated from the video frame of FIG. 6.

Reference is now made to FIG. 5 which illustrates the general elements of the image implantation system 14. Reference is also made to FIGS. 6 and 7 which are useful in understanding the operation of the system 14.

The system 14 typically comprises a feature identification unit 60 (FIG. 5) for identifying which features of the court 32 are present in each input video frame and a perspective identification unit 62 for identifying the viewing angle and zoom of an active camera 30 and for determining an appropriate perspective transformation between the model 50 and the input video frame. The system 14 also comprises a transformer 64 for transforming the implantation data from the model plane to the image viewing plane and a mixer 66 for mixing the perspective implantation data with the current video frame, thereby to implant the image 42 onto the court 32.

As described in more detail hereinbelow, the feature identification unit 60 utilizes the LUT to create a background mask of the input frame indicating which parts of the frame have possible background features of interest and which parts are foreground and therefore, are not to be changed in later operations. FIGS. 6 and 7 respectively provide an exemplary input frame 68 and its corresponding background mask 70.

The input frame 68 of FIG. 6 has two players 44 on the court 32. The background mask 70 of FIG. 7 shows the areas of the four colors. The areas marked 1, 1, 4 4 are the areas of line color, inner court color, outer court color and remaining colors, respectively. It is noted that the areas of the players 44 are marked with the background color 4 and cover over other important areas, such as those of the white lines 1.

From the background mask 70, unit 60 (FIG. 5) extracts the features of the playing field. For tennis courts, the features of interest are the lines 38. The perspective identification unit 62 compares the extracted features with those of the model 50 and produces therefrom a transformation matrix.

Using the transformation matrix, the transformer 64 converts the image implantation data (i.e. image 42 to be implanted, the image location mask 56 and the blending mask 58) to the perspective of the input video frame.

Finally, using the transformed image location mask 56 and the background mask 70, the mixer 66 implants the perspective version of image 42 into the desired background parts of the input video frame. Thus, if the players walk on the part of the court 32 where the image 42 is implanted, they will appear to walk "over" the implanted image. If desired, the transformed blending mask 58 can be utilized to blend the image 42 with the colors of the field on which the image 42 is implanted.

Figure 8:
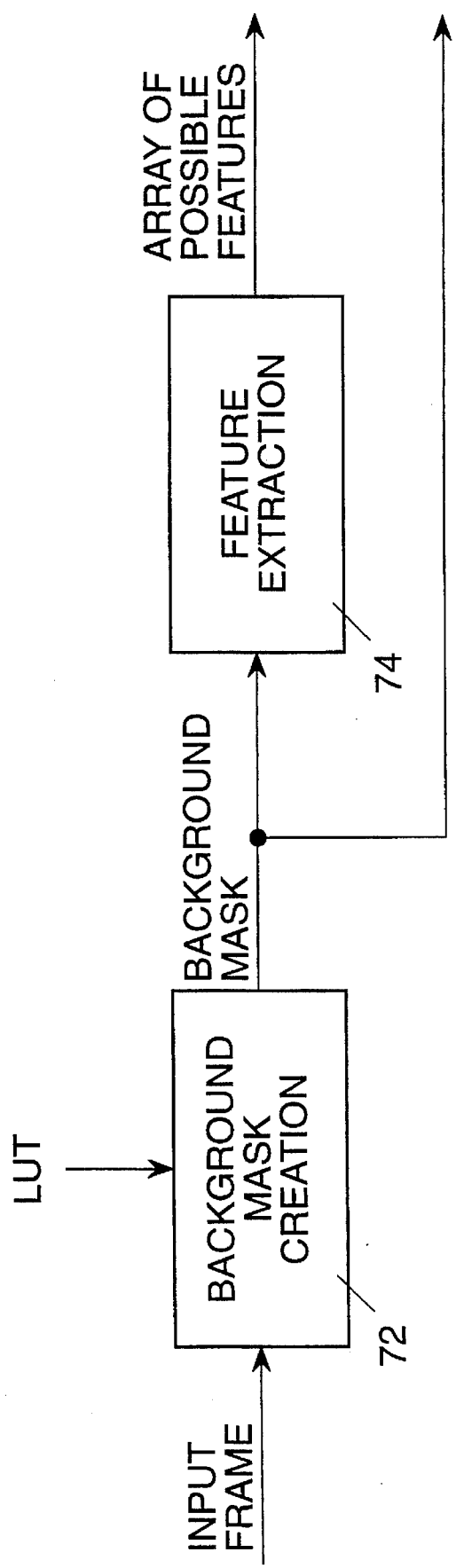
FIG. 8 is a block diagram illustration of the operations of a feature identification unit forming part of the image implantation unit of FIG. 5.

Reference is now made to FIG. 8 which details the operations of the feature identification unit 60. In step 72, unit 60 uses the LUT to convert the input video frame from a many colored frame to the four color picture called the background mask 70. Specifically, for the tennis court 32, the LUT provides first value to pixels having colors of the lines 38, a second value to pixels having colors of the inner court 36, a third value to pixels having colors of the outer court 40 and a fourth value (indicating foreground pixels) to the remaining pixels. This is shown in FIG. 7. The LUT can be implemented in any suitable one of the many methods known in the art.

The background mask 70 not only defines which pixels belong to the background of interest, it also includes in it the features of Interest, such as lines 38. Thus, in step 74, the feature identification unit 60 processes background mask 70 to extract the features of interest. Typically though not necessarily, the LUT is designed to provide the features with a single color value.

For the example of a tennis match, the extraction involves reviewing those pixels of the background mask 70 having the first value and extracting straight segments therefrom. For example, step 74 can be implemented with a Hough transform operating on the background mask 70. Hough transforms are described on pages 121–126 of the book *Digital Picture Processing*, Second Edition, Vol. 2 by Azriel Rosenreid and Avinash C. Kak, Academic Press, 1982, which book is incorporated herein by reference.

The result is an array of line parameters, each describing one straight segment in the background mask 70. The line parameters for each segment include the coefficients of the line equations describing it as well as a weight value indicating the number of pixels included within the segment.

Figure 9A:
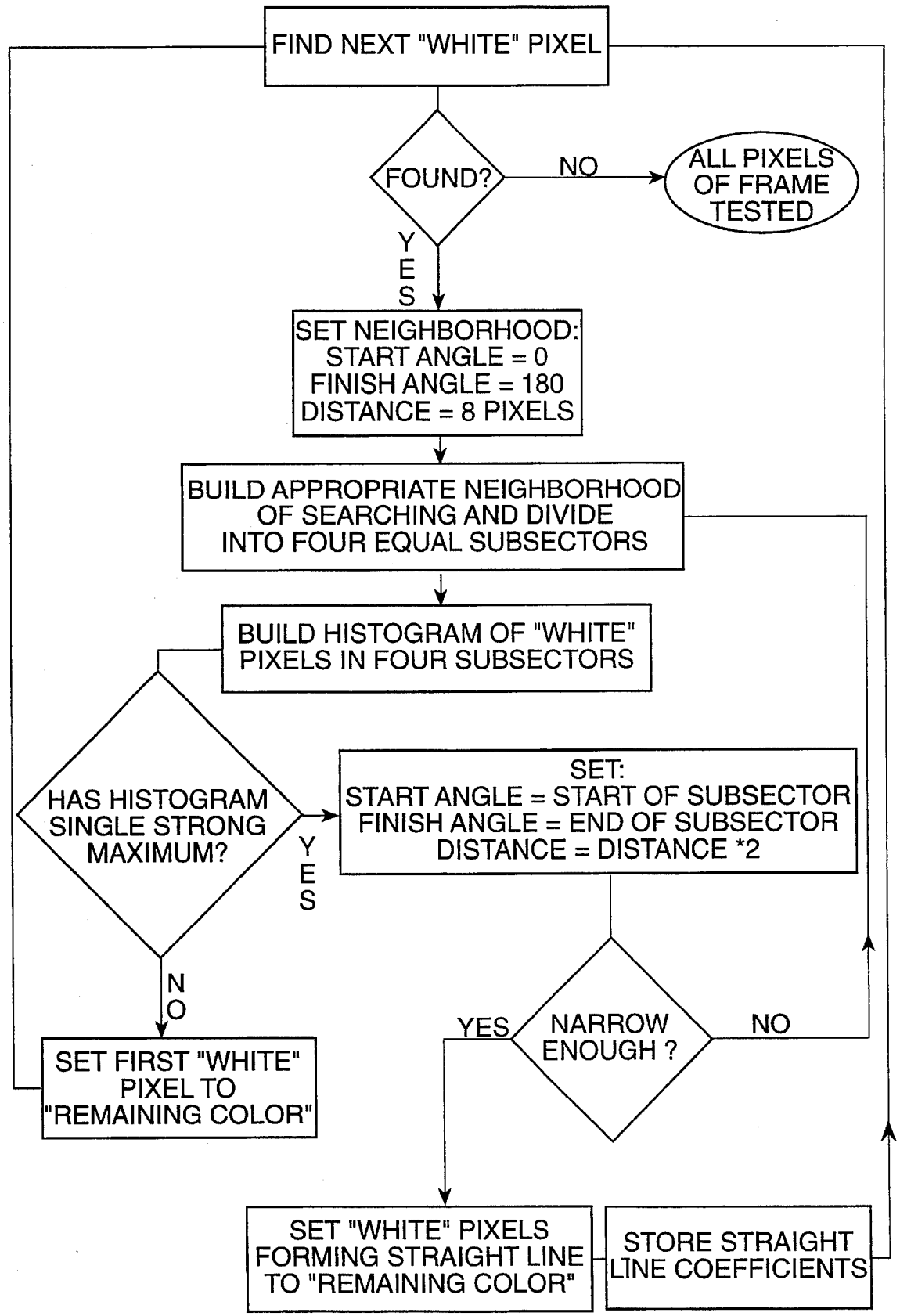
FIG. 9A is a flow chart illustration of a method of feature extraction.

An alternative method of extraction is illustrated in FIGS. 9A, 9B and 9C to which reference is now briefly made. As shown generally in FIG. 9A, the method begins at a first pixel 69 (FIG. 9B) of the background mask 70 having the color of interest (in this example, white) and looks in its neighborhood 75 to determine where there are more white pixels (marked by shading). To do so, it divides the neighborhood 75 into subsectors 71 74 of a predetermined size and performs a histogram of distribution of white pixels in the each subsector. FIG. 9C illustrates the histogram for the sectors 71 74 of FIG. 9B. The one with a strong maximum (subsector 73) is selected as the next sector for searching.

In the next step, a new neighborhood 78 is defined which consists of the selected subsector 73 and an extension thereof. The entire neighborhood 78 is twice as long as the neighborhood 75. This new neighborhood 78 is subdivided into four subsectors 76 and the process repeated.

This process continues until one of the following criteria are met:

1. the sub-sector is narrow enough to be deemed as a straight line;
2. no strong maximum is obtained in the histogram.

If condition 1 is obtained, the coefficients of the straight line are stored and the pixels forming the straight line are then "colored" to have the "remaining color" and so eliminated from the search.

The feature extraction process produces an array of possible features which includes the true features as well as stray lines.

Figure 10:
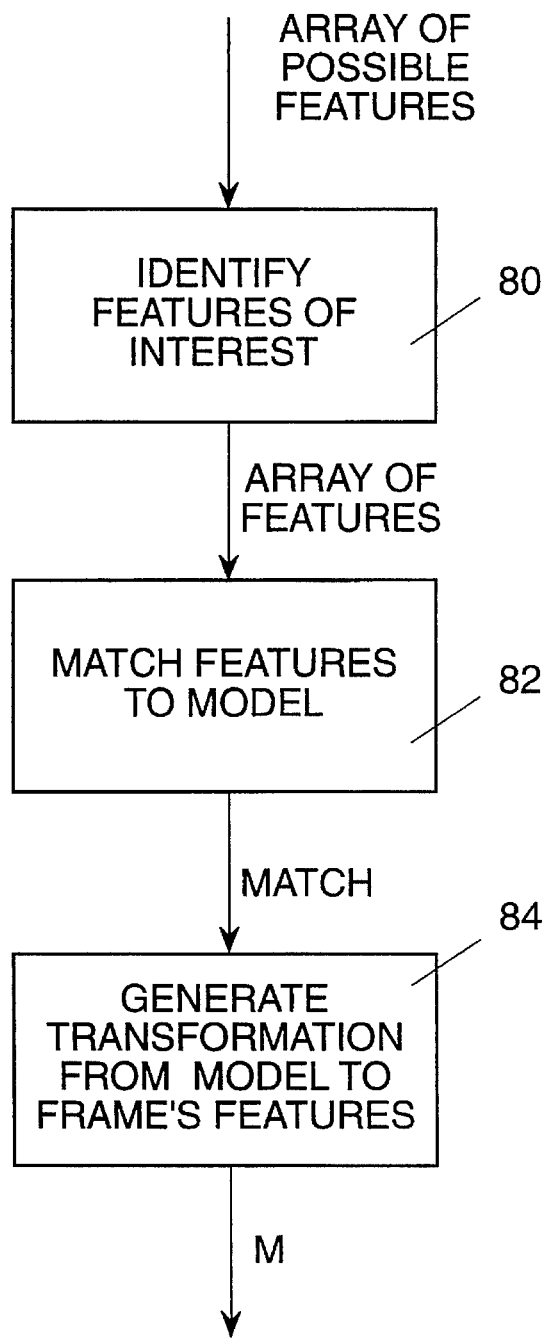
FIG. 10 is a block diagram illustration of the operations of a perspective identification unit forming part of the image implantation unit of FIG. 5.
Figure 11A:
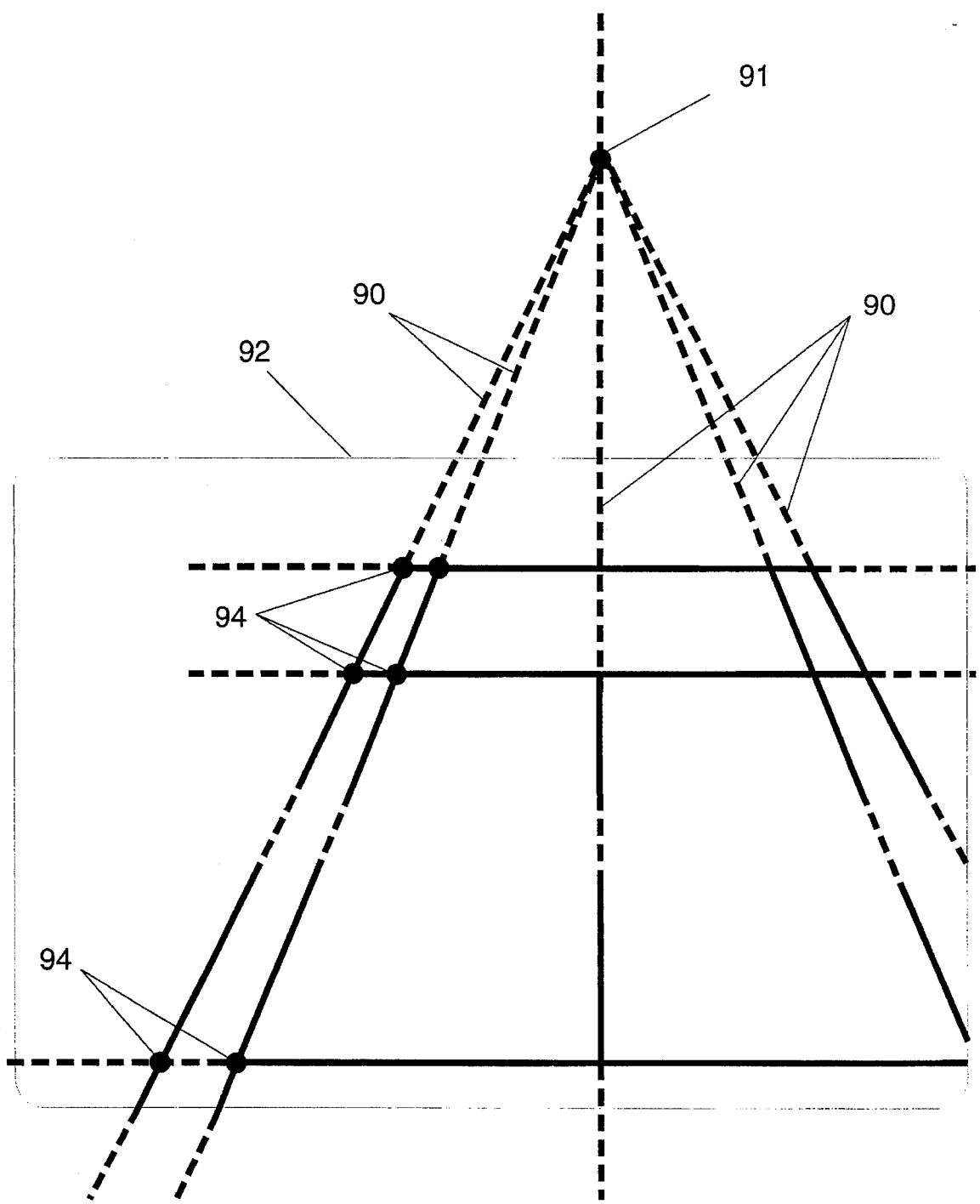
FIG. 11A is an illustration of the meeting points of extracted features from FIG. 7.
Figure 11B:
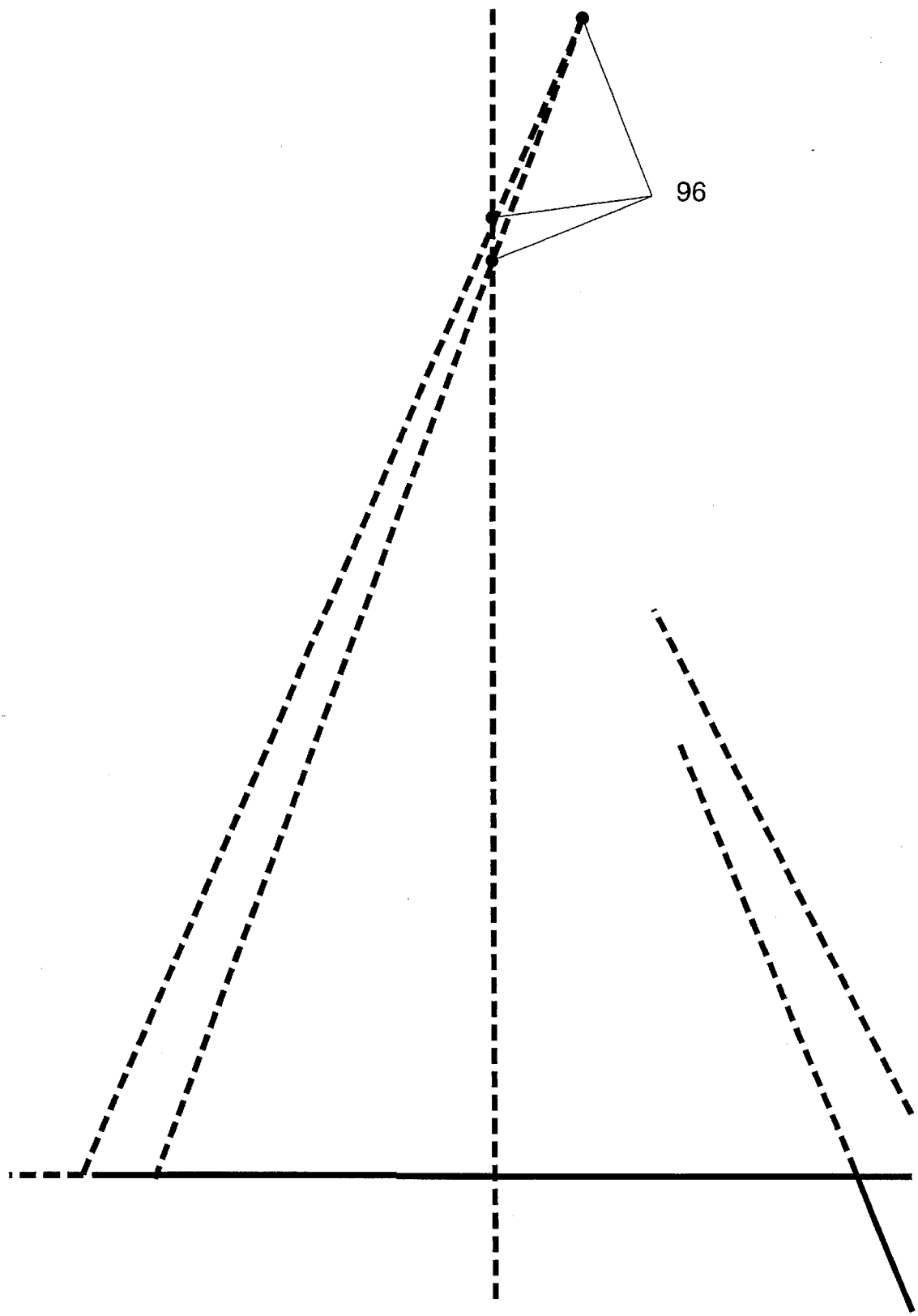
FIG. 11B is an illustration of perspective parallel lines meeting at different points due to calculation inaccuracies.

Reference is now made to FIG. 10 which illustrates, in general, the operations of the perspective identification unit 62 of FIG. 5. Reference is also made to FIGS. 11A and 11B which are useful in understanding the operation of unit 62 in general, to FIG. 13 which details the operations of unit 62 for the example of the tennis court 32 and to FIGS. 12A, 12B, 12C, 14A and 14B which are useful in understanding the operations detailed in FIG. 13.

Using a priori information, unit 62, in step 80, processes the array of possible features and determines which ones are most likely to be the features of interest. In step 82, unit 62 selects a minimum set of features from the resultant true features and attempts to match them to features of the model 50. The process is repeated as often as necessary until a match is found. In step 84, the matched features are utilized to generate a transformation matrix M transforming the model to the features in the input video frame.

In the example of the tennis court 32, step 80 utilizes the fact that the lines 38 of model 50 are parallel in two directions (vertical and horizontal) and that in perspective views (such as in the input video frame), lines which are parallel in reality meet at a finite point. This is illustrated in FIG. 11A in which all the extracted line segments, represented by solid lines, are extended by dashed lines. The perspective lines which correspond to parallel lines in reality (e.g. pseudo parallel lines 90) intersect at a point 91 far from the outer edges 92 of the frame. All other intersections, labeled 94, occur within the edges 92 or close to its borders.

However, as illustrated in FIG. 11B, because of digitization errors, it might be determined that the extensions of three pseudo parallel lines do not meet at a single point. In fact, they might meet at three widely separated points 96.

Figure 12A:
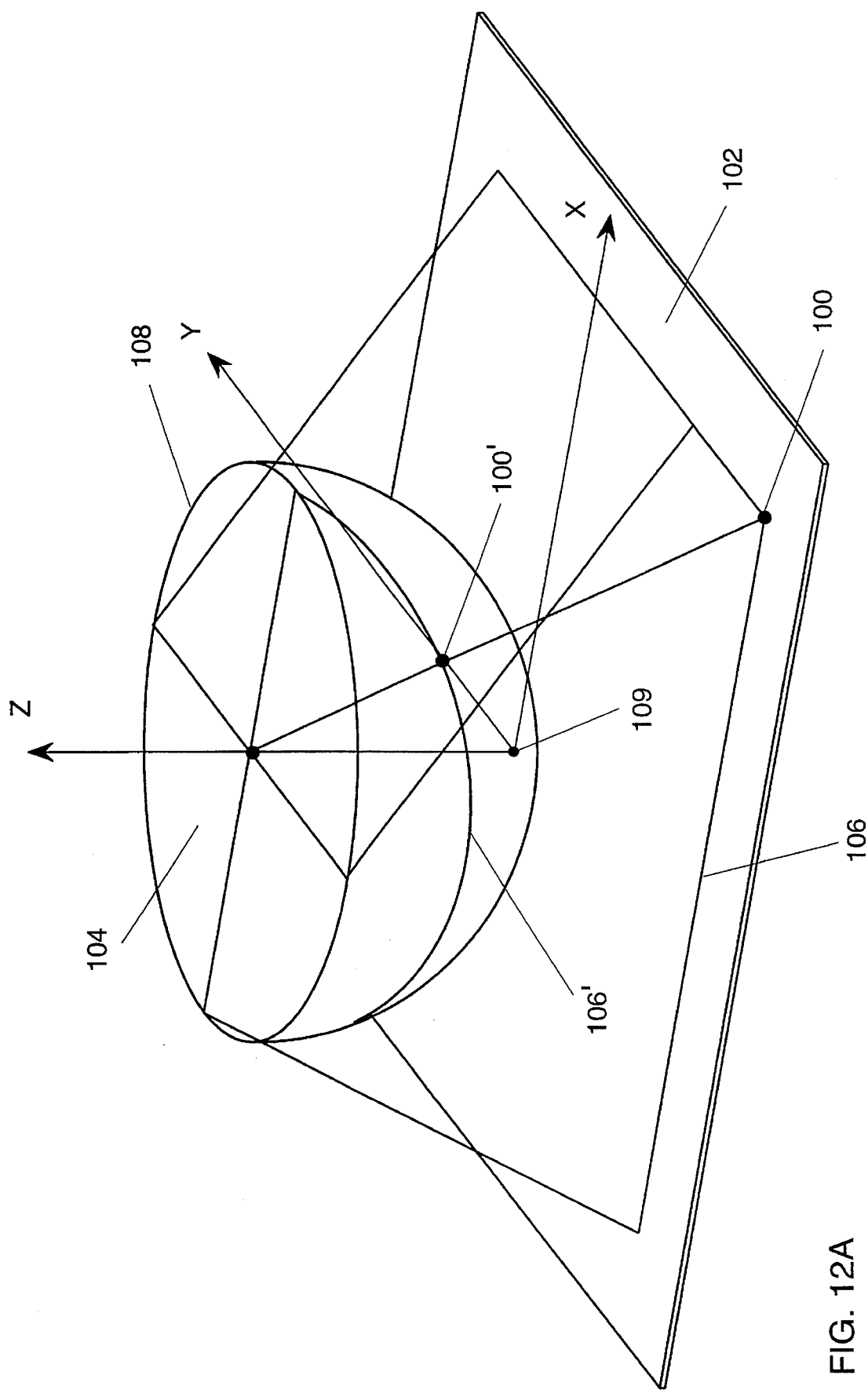
FIGS. 12A and 12B are illustrations of gnomonic projections, useful in understanding the operations of the perspective identification unit of FIG. 10.

Applicants have realized that, since perspective parallel lines do meet at infinity, the projection of the extracted lines onto an asymptotic function will cause the intersection points to occur close together. Therefore, in accordance with a preferred embodiment of the present invention, the extracted line segments are projected onto a two-dimensional asymptotic function. One such projection is known as a "Gnomonic Projection" and is described on pages 258, 259 and 275 of the book *Robot Vision* by Berthold Klans Paul Horn, The MIT Press, Cambridge, Mass., 1986, which pages are incorporated herein by reference. Examples of gnomonic projections are illustrated in FIGS. 12A and 12B.

In the gnomonic projection, a point 100 on an XY plane 102 is projected onto a point 100' on a hemisphere 104. A line 106 in the XY plane is projected onto a great arc 106' of the hemisphere 104 (i.e. an arc of a great circle of a sphere). The origin is represented by the south pole 109 and infinity is represented by the equator 108. Thus, any cluster 110 (FIG. 12B) of points near the equator 108 represents the intersection of pseudo parallel lines and thus, the lines which have points going through a cluster 110 are parallel lines.

Figure 12B:
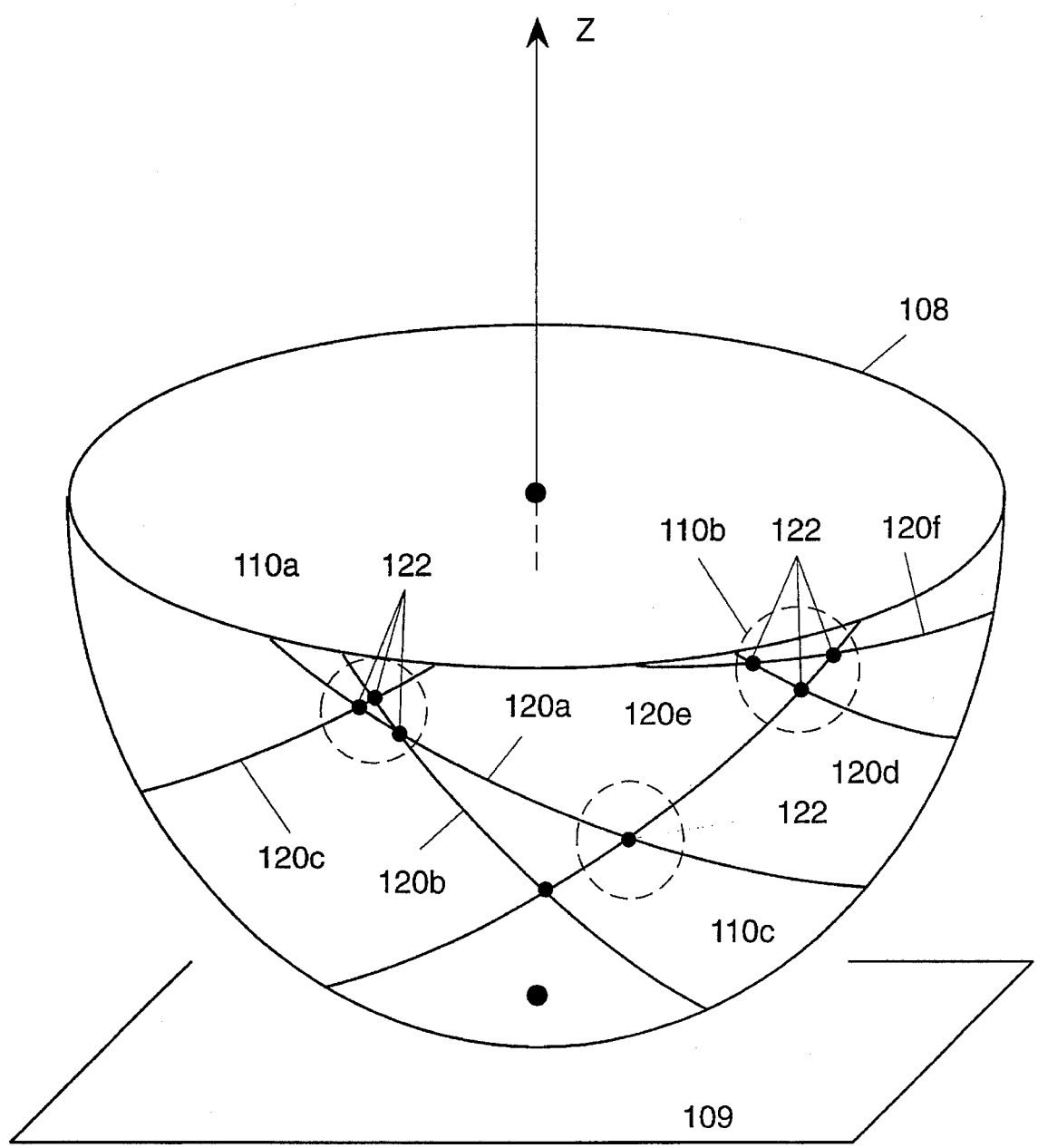

FIG. 12B illustrates a plurality of great arcs, labeled 120a–120f, corresponding to some arbitrary extracted line segments (not shown). The three arcs 120a–120c have intersection points 122 which form a cluster 110a near the equator 108. Great arcs 120d–120f also intersect near the equator, but at cluster 110b. All of the great arcs intersect each other, but their other intersections are at locations closer to the south pole 109 than to the equator 108.

In step 130 (FIG. 13), the gnomonic projection is utilized to produce an array of great arcs from the array of straight line segments produced from the feature extraction (step 74, FIG. 8).

Figure 12C:
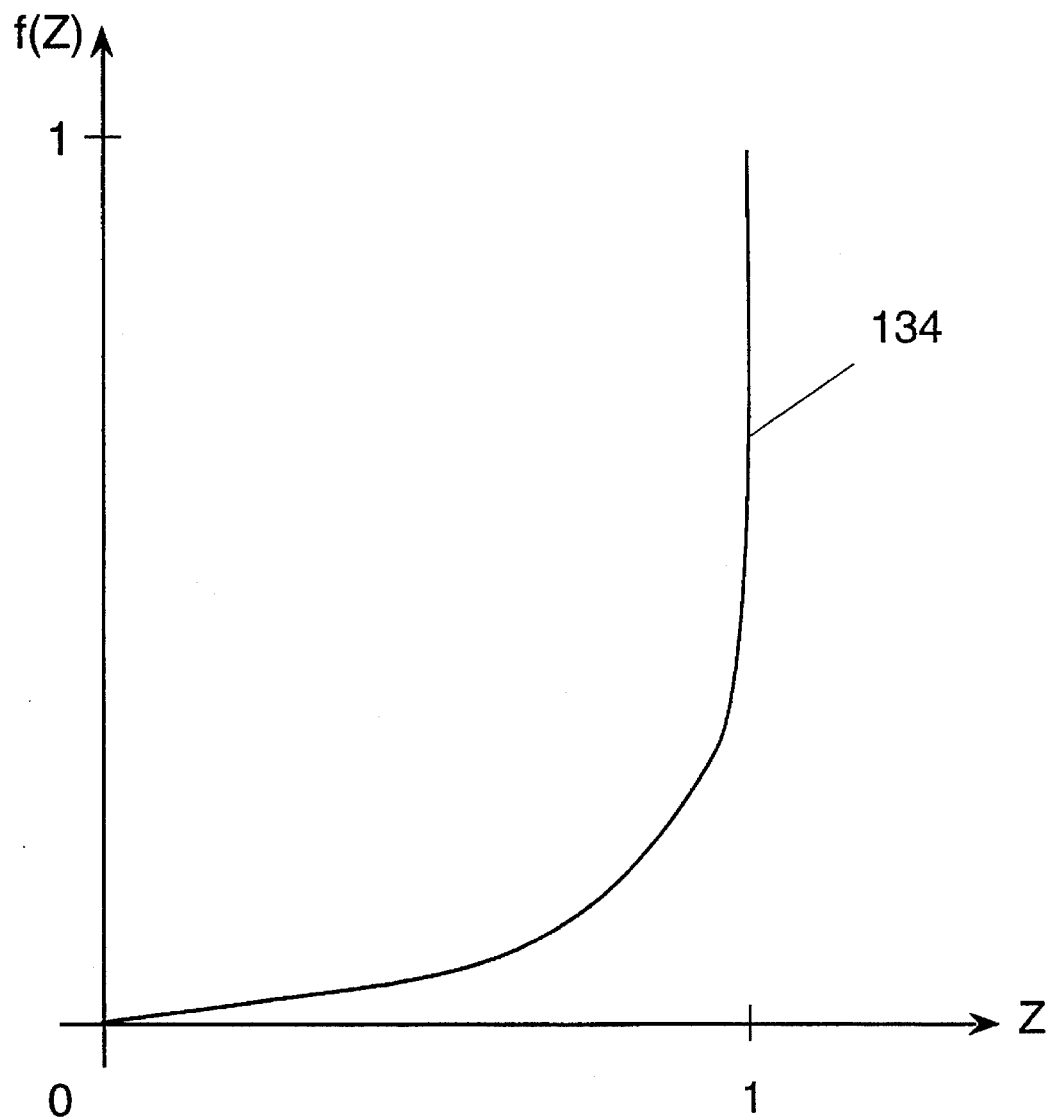
FIG. 12C is a graphical illustration of an exemplary function useful for the gnomonic projections of FIGS. 12A and 12B.

In step 132, the area around equator 108 is searched to find all of the intersection points 122. A value $V_k$ is given to each intersection point. The value $V_k$ is a function of the weights $W_i$ of the line segments which intersect and the Z coordinate of the intersection point 122. An example of a function $V_k$ is provided in equation 1:

$$V_k = W_{line\ 1} * W_{line\ 2} * f(Z_{intersection\ point}) \qquad (1)$$

where $f(Z_{intersection\ point})$ is any function having a curve similar to curve 134 of FIG. 12C wherein most points receive a low value and only those points approaching the equator 108 (Z=1) receive values close to 1. For example, $f(Z_{intersection\ point})$ might be $Z^5$.

In step 136, a small neighborhood around each intersection point 122 is searched for other intersection points. If any are found, the present intersection point and the ones found are stored as a cluster 110 (FIG. 12B). A cluster 110 is also defined as one whose value of $f(Z_{intersection\ point})$ is above a predefined threshold. Thus, a cluster 110 can include only one intersection point. In FIG. 12B there are three clusters 110a–110c, one of which, cluster 110c, includes only one intersection point 122.

Once all of the points have been searched, a location of each cluster 110 is determined by Finding the "center of gravity" of the points in the cluster. The weight of the cluster 110 is the sum of the values $V_k$ of the points in the cluster.

In step 138, the two clusters with the highest weights are selected. For the example of FIG. 12B, clusters 110a and 110b are selected.

In step 140, one cluster is assumed to represent "vertical" lines and the other to represent "horizontal" lines. Also, in step 140, the straight segments corresponding to the lines of the two selected clusters are marked "vertical" or "horizontal", respectively.

Figure 14A:
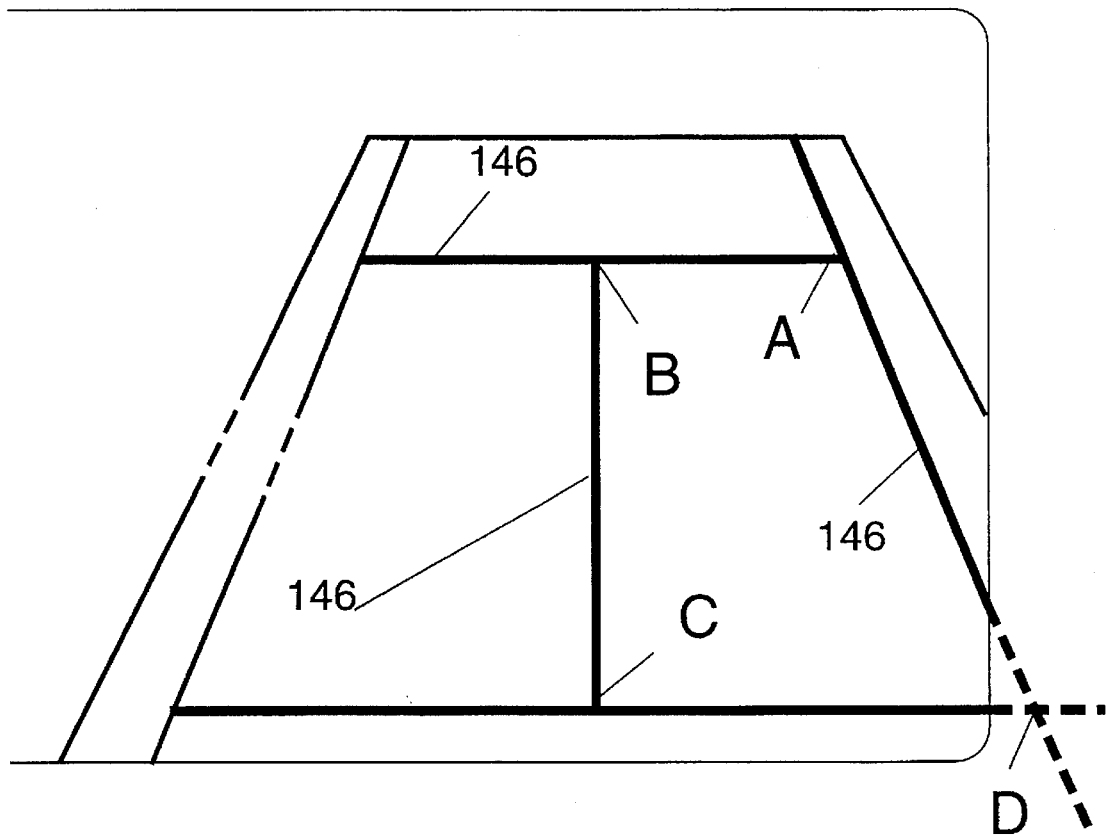
FIGS. 14A and 14B are useful in understanding the operations of FIG. 13.

In step 142, the "vertical" and "horizontal" lines are reviewed and the two heaviest vertical and two heaviest horizontal lines are selected, where "heaviest" is determined by the values of $W_i$. The selected lines, labeled 146, are shown in FIG. 14A for the lines of FIG. 11A. In step 144 the intersection points, labeled A, B, C and D, of the four selected lines are determined and stored. As shown in FIG. 14A, the selected lines may intersect out of the frame.

Steps 130–144 are the operations needed to identify the true features in the video frame (step 80 of FIG. 10). The output of step 144 are the features which are to be matched to the model. The remaining steps match the features to the model and determine the transformation (steps 82 and 84 of FIG. 10) as an integrated set of operations.

A standard tennis court has five vertical lines and four horizontal lines. Since it is not possible to differentiate between the two halves of the court, only three horizontal lines are important. The number of different quadrilaterals that can be formed from a selection of two horizontal lines out of three (three possible combinations) and two verticals out of five (10 possible combinations) is thirty. The thirty quadrilaterals may be in four different orientations for a total of 120 rectangles.

Figure 14B:
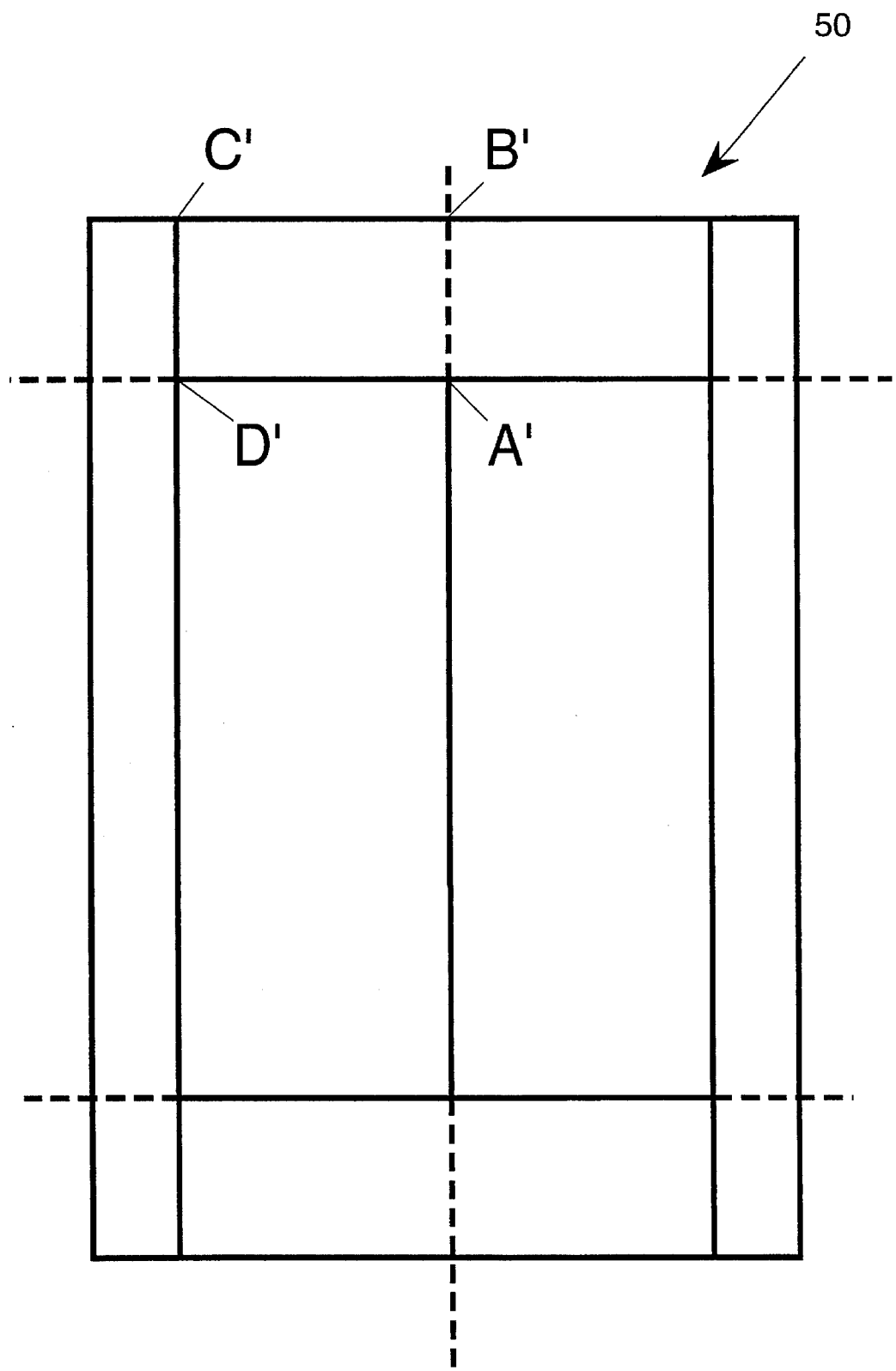

In step 150, one of the 120 rectangles in the geometric model 50 is selected by selecting its four corners, labeled A', B', C' and D' (FIG. 14B). As can be seen, this is not the correct match.

In step 152, the matrix M, which transforms from the four points A', B', C' and D' of the model (FIG. 14B) to the four points A, B, C, D of the video frame (FIG. 14A), is determined. The matrix M can be represented as a superposition of subsequent transformations as explained with reference to FIG. 15.

Figure 15:
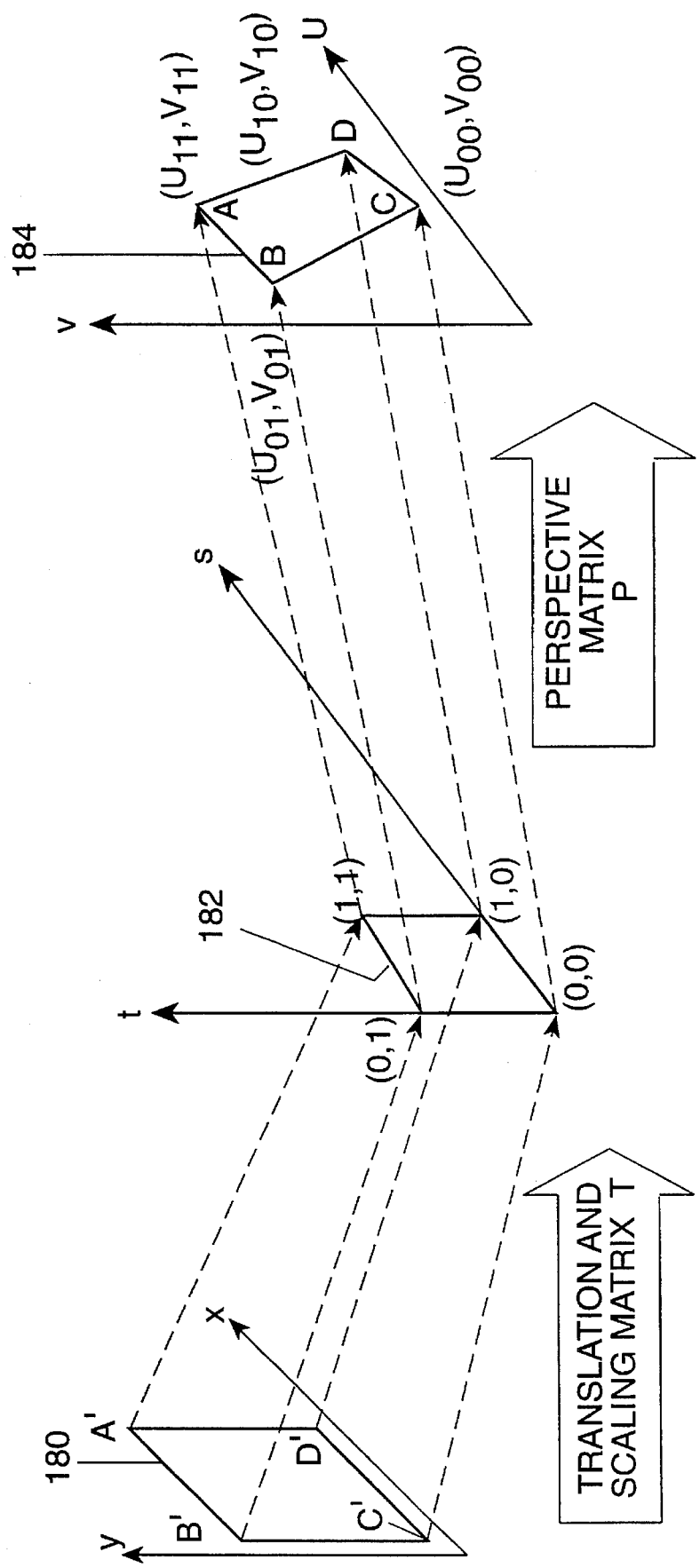
FIG. 15 is an illustration of the use of transformation matrices.

FIG. 15 shows three quadrilaterals 180, 182 and 184. Quadrilateral 180 is the model quadrilateral ABCD shown in an XY plane, quadrilateral 182 is a unit square having points (0,1), (1,1), (0,0) and (1,0) in a TS plane, and quadrilateral 184 is the perspective quadrilateral 184 in a UV plane.

The transformation M from model quadrilateral 180 to perspective quadrilateral 184 can be represented by the superposition of two transformations, a translation and scaling matrix T from quadrilateral 180 to the unit square 182 and a perspective matrix P from the unit square 182 to quadrilateral 184. Matrix T, in homogeneous coordinates, has the form:

$$T = \begin{vmatrix} Sx & 0 & 0 \\ 0 & Sy & 0 \\ Tx & Ty & 1 \end{vmatrix} \quad (2)$$

where Sx and Sy are the scaling factors in the X and Y directions, respectively and Tx and Ty are the X and Y translation factors. Sx, Sy, Tx and Ty are determined by the equation:

$$(x,y,1)*T=(s,t,1) \quad (3)$$

for the four coordinates (x,y,1) of quadrilateral 180 and the four coordinates (s,t,1) of unit square 182.

Matrix P, in homogeneous coordinates, has the form:

$$P = \begin{vmatrix} a11 & a12 & a13 \\ a21 & a22 & a23 \\ a31 & a32 & a33 \end{vmatrix} \quad (4)$$

The elements of the matrix P are determined by solving the following equation:

$$(s,t,1)*P=(u,v,w) \quad (5)$$

where (u, v, w) represents the four known coordinates of the points A, B, C and D of quadrilateral 184, as shown in FIG. 15, and w is always normalized.

Assume a33=1, then P can be calculated as follows:
From (s,t, 1)=(0,0,1), we determine that $$a31=U_{00}$$

$$a32=V_{00} \quad (6)$$

From (s,t,1)=(1,0,1), we determine that:

$$a11+a31=U_{10}(a13+1) \Rightarrow a11=U_{10}(a13+1)-U_{00}$$

$$a12+a32'V_{10}(a13+1) \Rightarrow a12=V_{10}(a13+1)-V_{00} \quad (7)$$

From (s,t,1)=(0,1,1) we determine that:

$$a21+a31=U_{01}(a23+1) \Rightarrow a21=U_{01}(a23+1)-U_{00}$$

$$a22+a32=V_{01}(a23+1) \Rightarrow a22=V_{01}(a23+1)-V_{00} \quad (8)$$

From (s,t,1)=(1,1,1) we determine that:

$$a11+a21+a31=U_{11}(a13+a23+1)$$

$$a12+a22+a32=V_{11}(a13+a23+1) \quad (9)$$

From equations 7–9, two equations in two unknowns, a13 and a23, are produced, as follows:

$$a13(U_{10}-U_{11})+a23(U_{01}-U_{11})=U_{11}+U_{00}-U_{10}-U_{01}$$

$$a13(V_{10}-V_{11})+a23(V_{01}-V_{11})=V_{11}+V_{00}-V_{10}-V_{01} \quad (10)$$

Once a13 and a23 are determined, the remaining elements can be determined from equations 7 and 8.

The transformation, or mapping, matrix M is the matrix product of matrices T and P, as follows:

$$M=T*P \quad (11)$$

Figure 16:
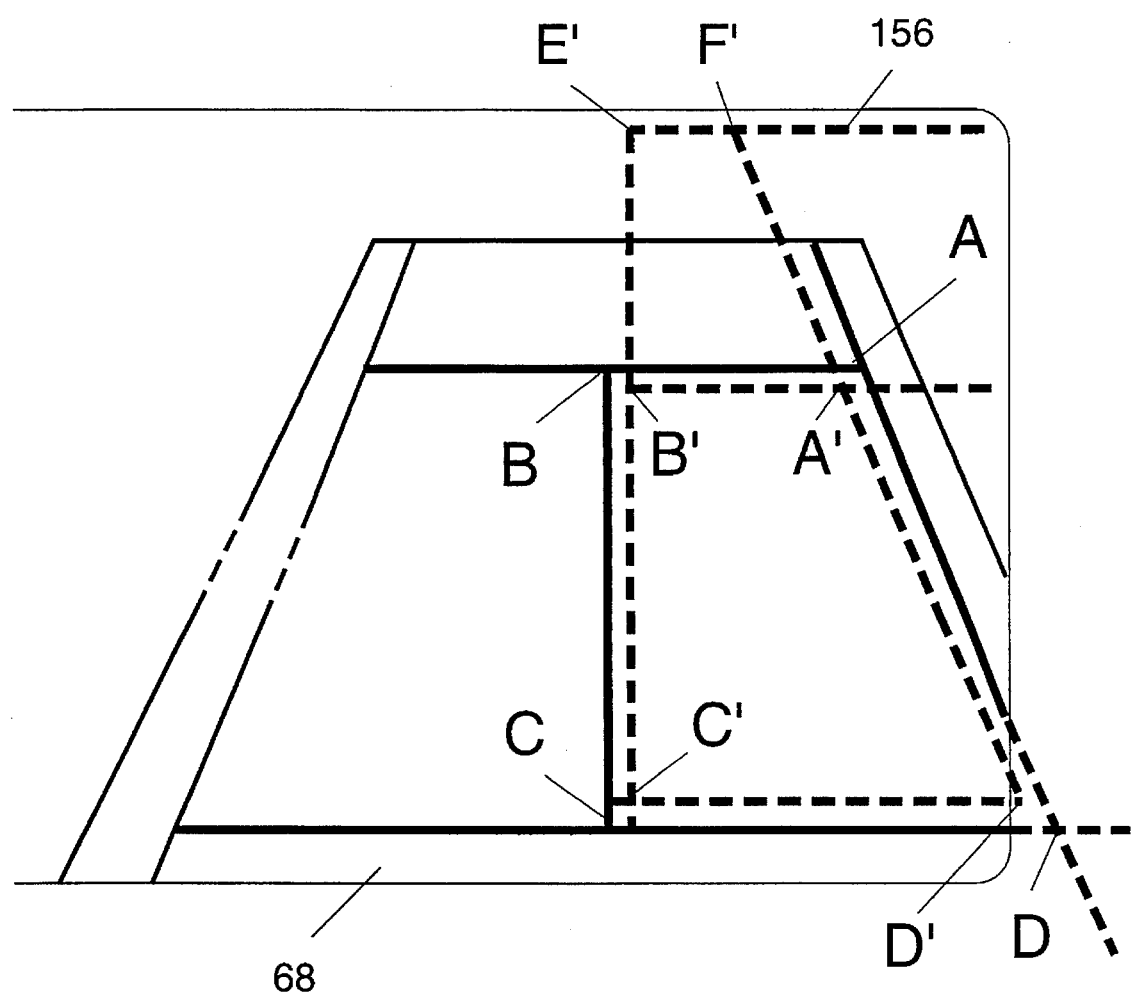
FIG. 16 is an illustration useful in understanding the matching process between quadrilaterals and the geometric model, useful in understanding the operations of FIG. 13.

In step 154, the lines 38 of the model 50 are mapped onto the video frame using the mapping matrix M. The result is a distorted frame 156 (FIG. 16) having 1s wherever the converted pixels of the model exist and 0s everywhere else. As can be seen, the points A', B', C' and D' match the points A, B, C and D, respectively. However, the rest of the geometric model 50 does not.

In step 158 the distorted frame 156 is XOR'd with the background mask 70 (FIG. 7). The XOR step outputs a 0 on two occasions: a) the pixels of the distorted frame 156 have a 1 value and the pixels of the video frame have the field line color; and b) the pixels of the distorted frame 156 have a 0 value and the pixels of the video frame have the "non-line" color. The remaining situations receive 1 values.

In steps 160 and 161 the number of pixels having 1 values are counted and the value is associated with transformation matrix M.

After all of the matrices M have been determined, in step 162 the matrix having the least weight is selected. Since there is a possibility that no match can be made (i.e. the video is showing a commercial, the television cameras 30 are viewing the audience, etc.), in step 164, the weight of the selected matrix is checked against a threshold. If it is above that value, then a null transformation matrix is provided. Otherwise, the selected matrix is defined as the transformation matrix M. Null transformation matrices are also provided when test conditions, of any of the previous steps, fail.

Figure 17:
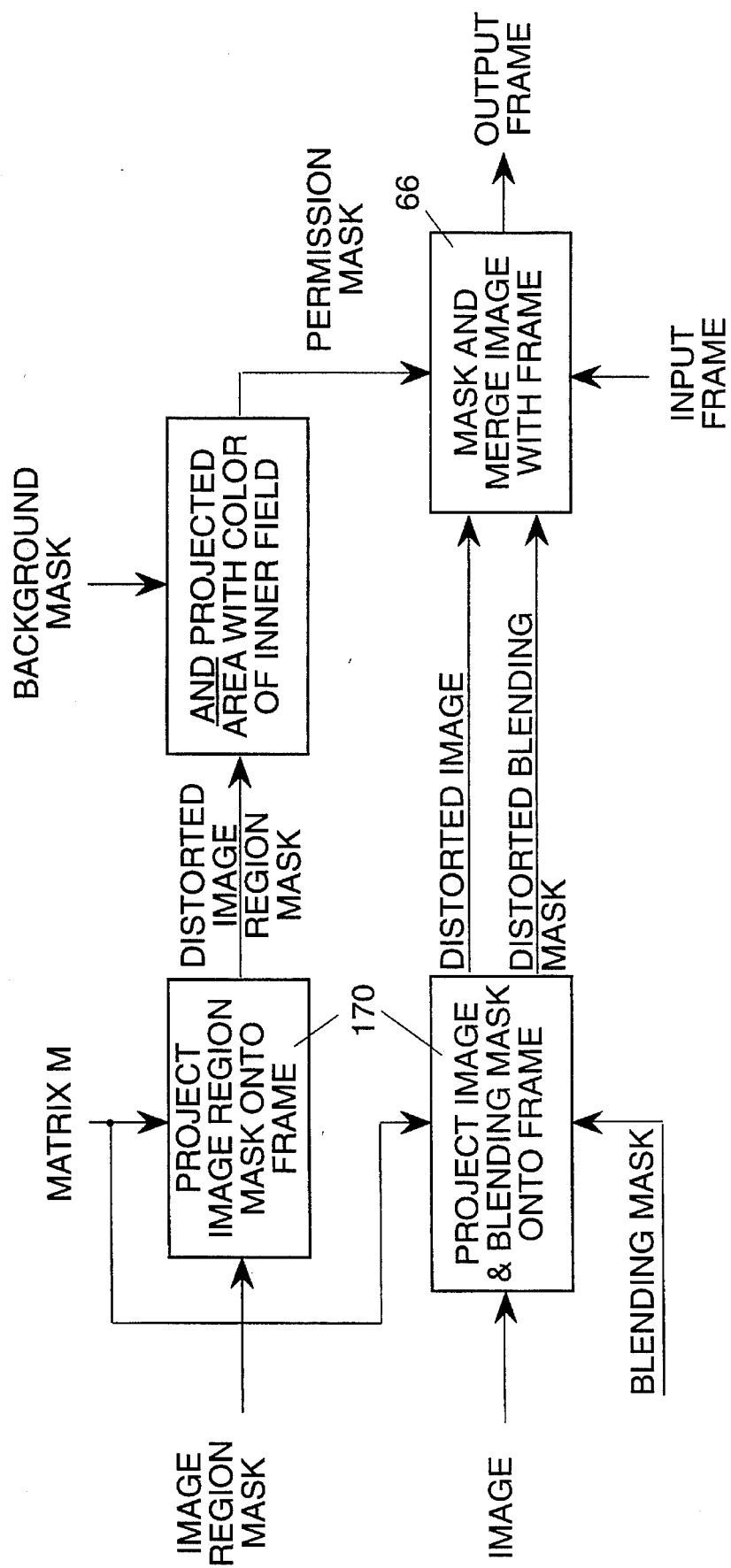
FIG. 17 is a block diagram illustration of the operations of transformer and mixing units of the image implantation unit of FIG. 5.

Reference is now made to FIG. 17 which illustrates the operations of the transformer 64 and the mixer 66 of FIG. 5. The transformer 64 utilizes the transformation matrix M to distort each of the image 42, the image region mask 56 and the blending mask 58 into the plane of the video frame (step 170). It also ANDs the distorted image region mask with the background mask 70, producing therefrom a permission mask. The permission mask indicates those pixels of the video frame which are both background pixels and within the image region. Onto these pixels the image will be implanted.

The mixer 66 combines the distorted image with the video frame in accordance with the blending and permission masks. The formula which is implemented for each pixel (x,y) is typically:

$$Output(x,y)=\beta(x,y)*image(x,y)+(1-\beta(x,y))*video(x,y) \quad (12)$$

$$\beta(x,y)=\alpha(x,y)*P(x,y) \quad (13)$$

where Output(x,y) is the value of the pixel of the output frame, image(x,y) and video(x,y) are the values in the implanted image 42 and the video frame, respectively, $\alpha(x,y)$ is the value in the blending mask 58 and P(x,y) is the value in the permission mask.

The description hereinabove assumes that the LUT which produced the background mask 70 remains correct during the entire game. If the lighting changes (which typically occurs in outdoor games), the colors in the video sequence can change and, as a result, the background mask 70 will no longer correctly indicate the background elements. Therefore, a correction procedure can be periodically performed. The correction procedure is detailed in FIG. 18 to which reference is now made.

It is noted that, in the calibration process, test spots, indicating the features of interest in the background (such as field lines and the inner and outer courts) were selected by the operator. The spot locations were saved, as were their color values.

Once the matrix for the calibration video frame is determined, the locations of the test spots are converted from the video frame plane into the geometric model plane (i.e. by using the inverse of the matrix M). At some later time when calibration is desired, the test spots are converted into the current video frame plane. The distorted test spots which are within the current video frame are selected and their neighborhoods sampled. The color characteristics of each neighborhood are calculated (using histograms, for example) and the result is compared to the characteristics of the saved spot. If there is any significant change in the colors, the LUT is corrected and the relevant spots converted to the geometric model and saved.

It will be appreciated that the present invention encompasses the process described hereinabove for tennis games as well as for other situations in which the background information is fixed and known. The process described hereinabove can be improved in a number of ways, through tracking and through knowledge of the camera parameters, as described hereinbelow.

When information on each camera position, rotation angles and amount of zoom are supplied (either externally or determined by the system), the operations described hereinabove can be shortened since the number of degrees of freedom of the perspective matrix P are reduced.

Specifically, the perspective matrix P includes in it information regarding the position, rotation angles and zoom of the camera utilized. This information can be extracted and the perspective matrix P (or, similarly, the transformation matrix M) can be redefined as a function of each cameras parameters.

Figure 19:
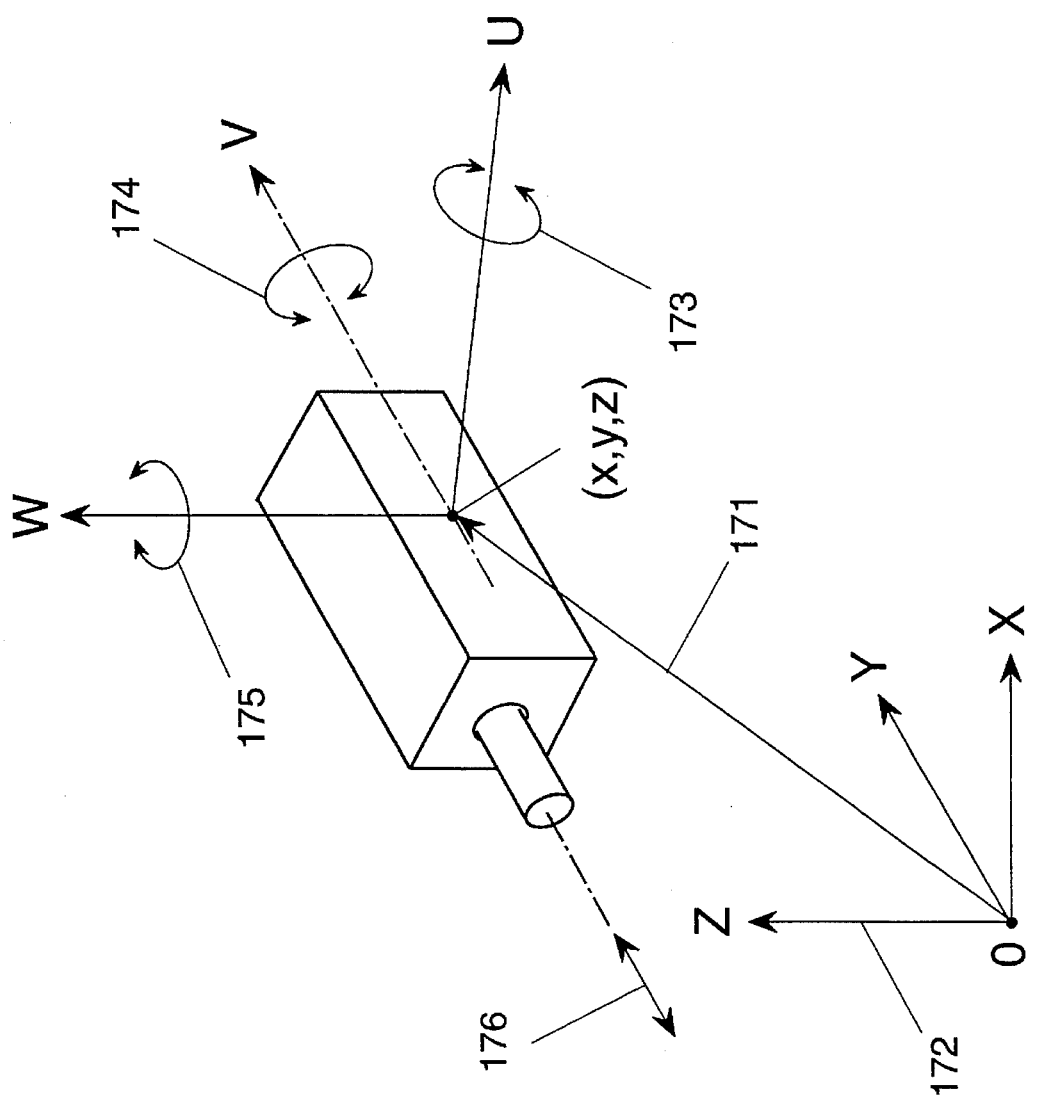
FIG. 19 is a schematic illustration of camera parameters.

FIG. 19 illustrates a camera and its parameters. Its location is denoted by the vector 17 1 having coordinates (x,y,z) from the origin 0 of the X, Y, Z coordinate system 172. The camera rolls, tilts, turns and pans respectively, about camera-based axes U, V and W, as indicated by arrows 173, 174 and 175, respectively. Furthermore, the camera lens can zoom along the V axis, as indicated by arrow 176.

Assuming that the camera does not roll and that the aspect ratio of the camera (the ratio between the width and height of a pixel in the image which the camera produces) defines square pixels, the perspective matrix P can be parameterized as a function of the location (x,y,z) of the camera and of its tilt, turn and zoom. It is assumed that the camera does not change position from frame to frame but just changes its tilt, turn, angles or zoom.

Figure 13:
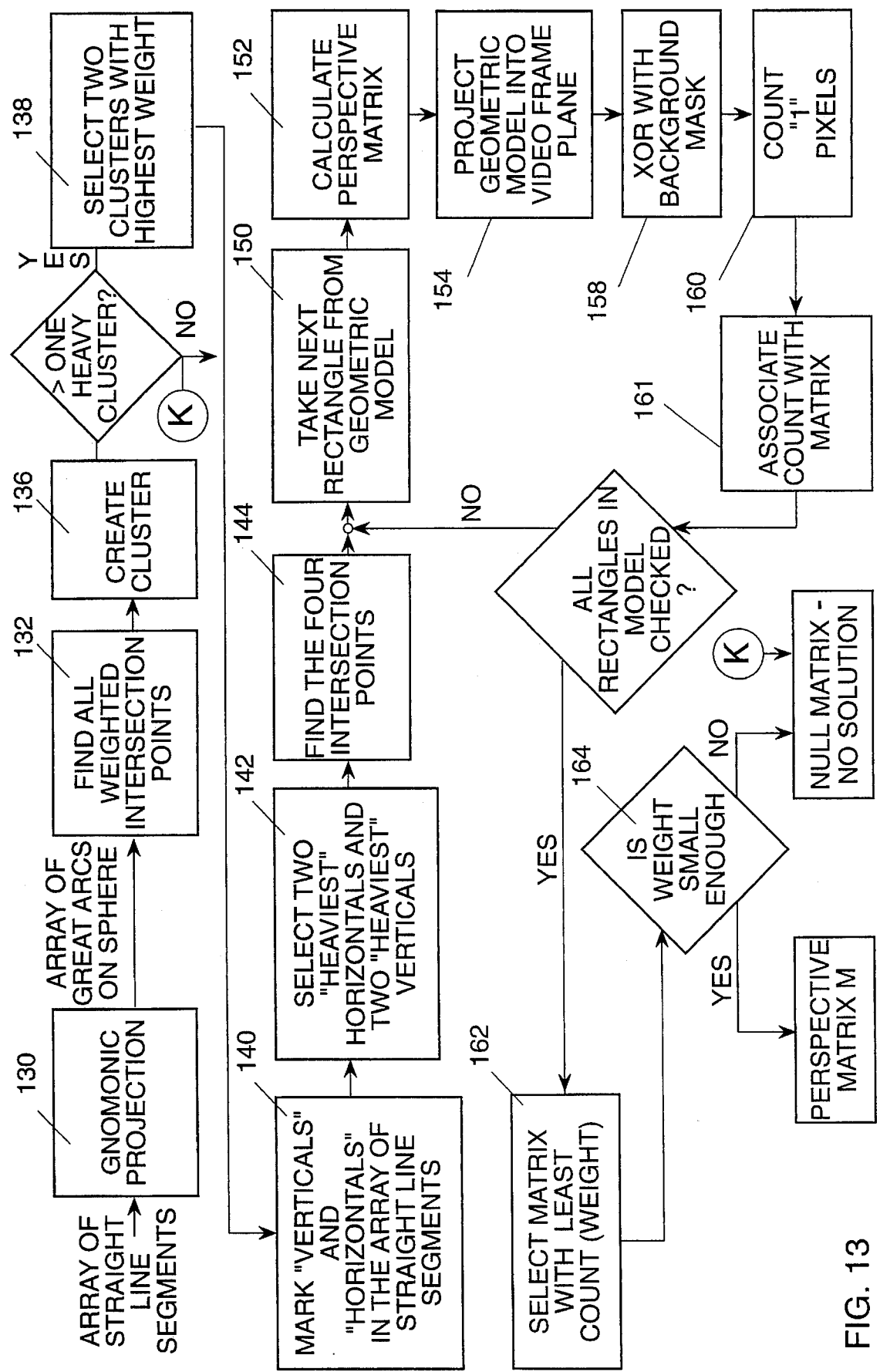
FIG. 13 is a detailed block diagram illustration of the operations illustrated in FIG. 10.
Figure 20:
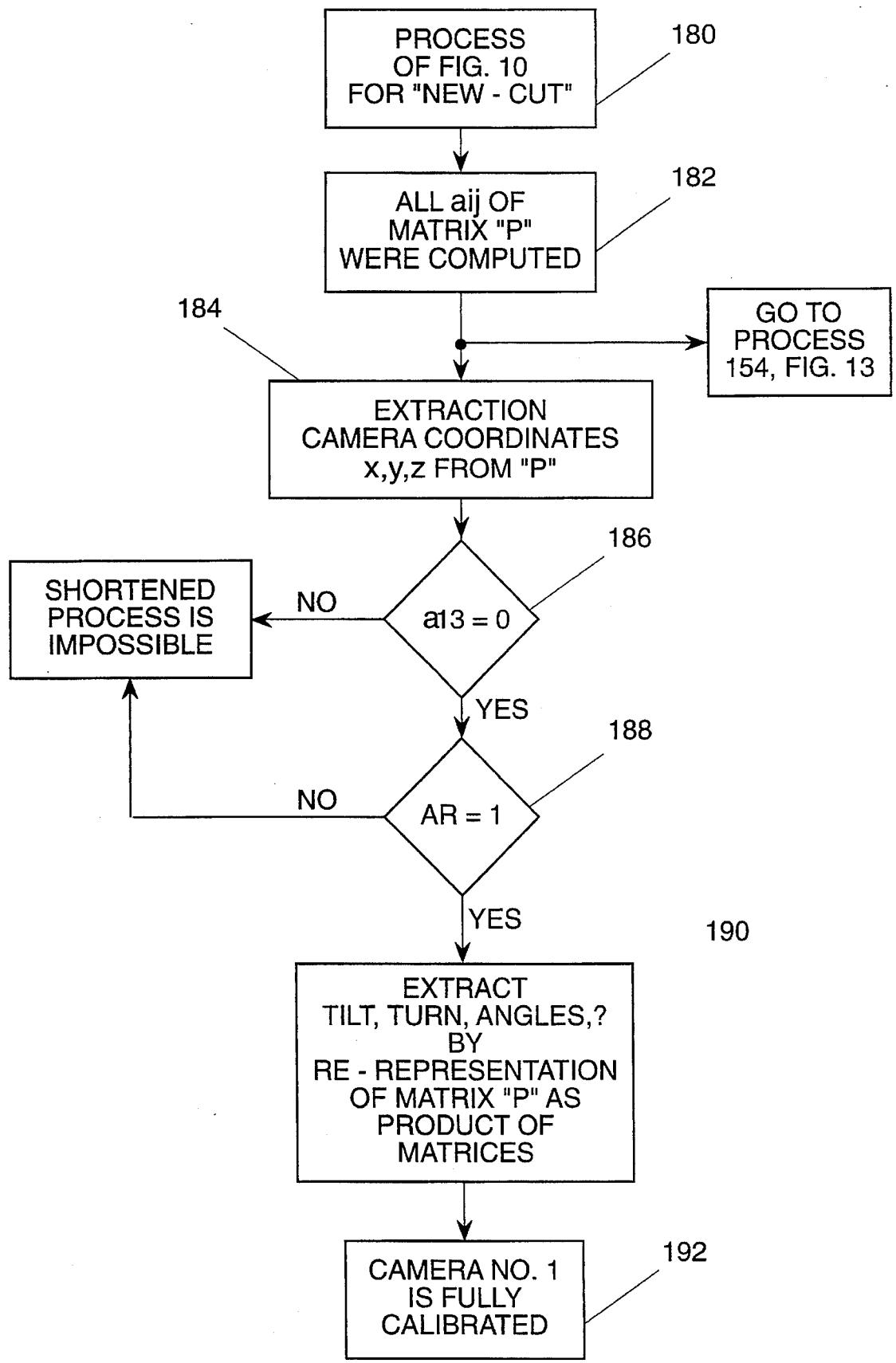
FIG. 20 is a flow chart illustration of transformation matrix operations when the camera parameters of FIG. 19 are known or calculable.
Figure 22:
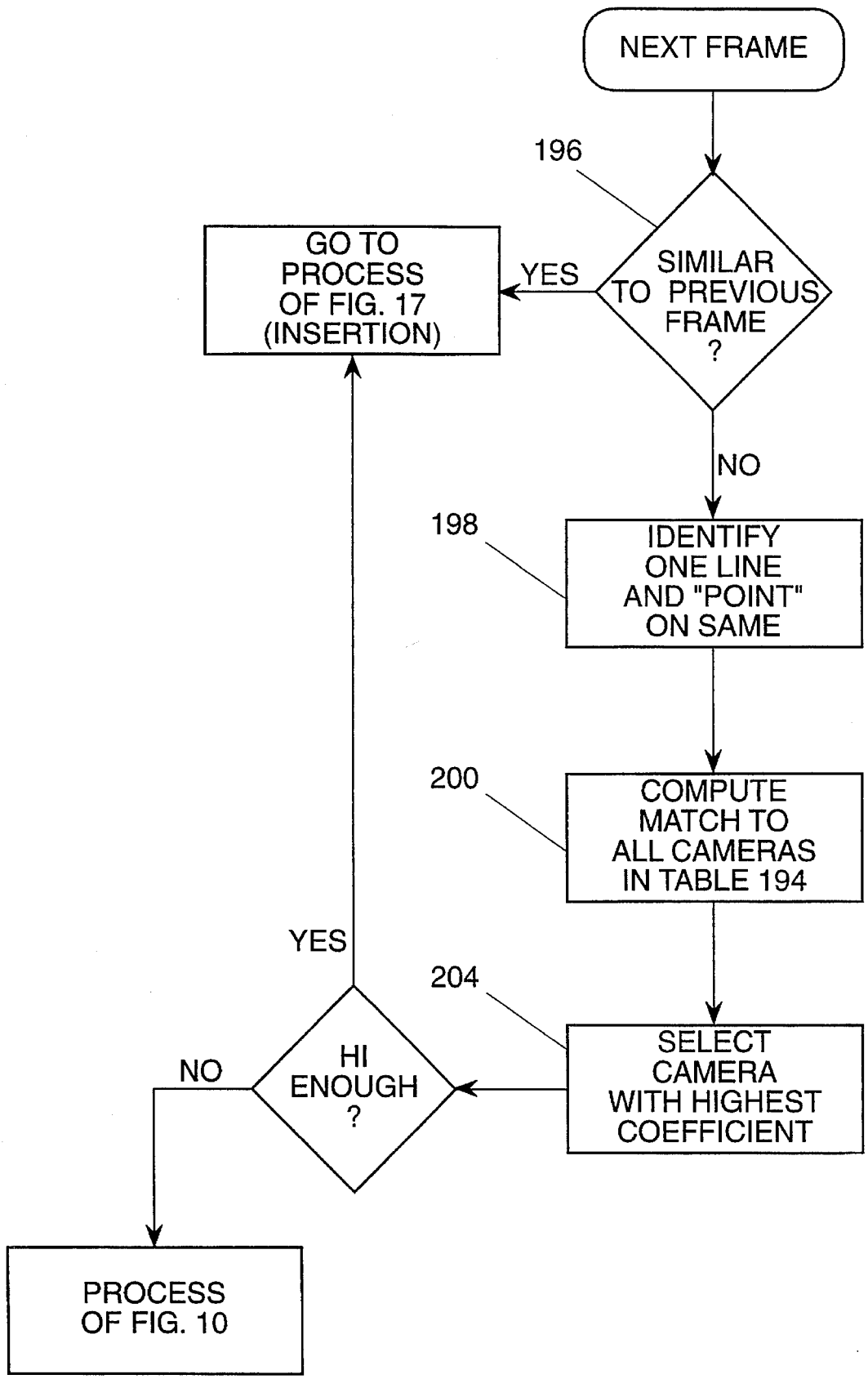
FIG. 22 is a flow-chart illustration of a method of operation when the camera parameters are known or calculable.

FIGS. 20, 21 and 22 represent the method of determining and then utilizing the camera parameters. In FIG. 20, when a new cut is identified in the video flow, the entire process of perspective identification (step 180), as shown in FIG. 10, is performed on the first frame of the new cut. Step 180 produces the a(i,j) elements of the perspective matrix P. The process continues in two directions:

a) The transformation matrix T is determined, starting from step 154 of FIG. 13; and b) The camera coordinates (x,y,z) are extracted (step 184) from matrix P, as taught in section 3.4 of the book *Three-Dimensional Computer Vision: A Geometric Viewpoint*, by Oliver Faugeras, MIT Press, 1993. The book is incorporated herein by reference.

Once the camera coordinates (x,y,z) have been extracted, two checks (steps 186 and 188) are performed as follows:

Condition 186: The camera does not roll (rotate) in direction 174. Roll is present when the element $a_{13}$ is not equal to zero.

Condition 188: The aspect ratio (AR) of the camera defines square pixels. (i.e., AR=1)

If either condition is false, the remainder of the shortened process is aborted.

If both conditions are fulfilled, then, as taught in the book *Three-Dimensional Computer Vision: A Geometric Viewpoint*, the matrix P can be re-represented (step 190) as the product of the following matrices:

a) Zoom (I): the matrix of the projection of the camera focal-plane;

b) Translation: the matrix of translation from the coordinate system origin to the computed camera position, (x,y,z);

c) Tilt ($\alpha$): the matrix of the rotation around the U axis through the angle $\alpha$; and d) Turn ($\Theta$): the matrix of the rotation around the W axis through the angle $\Theta$.

With the values of zoom, tilt, turn and translation, the first camera is fully calibrated (step 192) and its parameters are inserted into a table 194 of the identified cameras (shown in FIG. 21). Other cameras will be identified and registered in table 194 as described hereinbelow.

The shortened calculation process, described with respect to FIG. 22, is then performed on all frames. A frame is examined (step 196) to determine its similarity to the previous frames, using $\alpha$, $\Theta$ and f. Similarity is measured via a matching coefficient (i.e., percentage of pixels of interest in the frame successfully mapped to the model using the computed matrix). If a good similarity is obtained, the computed matrix can be used for the insertion process (described with respect to FIG. 17). If the matching coefficient is small, it is possible that this frame was formed by another camera from table 194.

To find the other camera, the current frame must be reviewed and one line in it must be identified. Furthermore, a point on the identified line, such as an intersection point with another line, must also be identified (step 198). Usually the identified line is the "strongest" line.

In step 200, a match value for each camera listed in table 194 is determined, as follows:

The identified line and point are associated with a line and point in the geometric model, and a perspective matrix P for this association is determined which transforms the line and point of the model to the identified line and point. Since each perspective matrix P is a function of the coordinates (x,y,z) of the current camera (which are known) and the tilt $\alpha$, turn $\Theta$ and zoom f (which are unknown), the resultant perspective matrix P can be determined through the values of the tilt, turn and zoom which can be computed, assuming that the identified line and point are properly matched to the line and point of the model.

As in the method of FIG. 10, the transformation matrix M is determined from the perspective matrix P and the geometric model is transformed, through the matrix M, into the plane of the image in the frame. The lines of the model are matched to the lines in the image and a match value produced.

The process of associating a line and point of the model with the identified line and point, producing a perspective matrix P from the known camera coordinates and the association of lines and points, and determining a match value as a result, is repeated for each combination of line and point in the geometric model if the match values are considerably less than 1, indicating that the match was very poor, the match process with the identified line and point, described hereinabove, is repeated for another camera whose coordinates (x,y,z) are known.

The largest, computed matching coefficient for each camera is inserted into a column, labeled 202, of table 194 (FIG. 21). In step 204, the camera with the highest value of coefficient 202 is selected, and, if the coefficient is larger than a predefined threshold, its perspective matrix P is used for the image insertion process of FIG. 17. If the highest coefficient in column 202 has a value lower than the threshold, no known camera was used to shoot the current frames. The process of FIG. 10 must be performed followed by the camera identification process of FIG. 20.

It will be appreciated by persons skilled in the art that the present invention is not limited to what has been particularly shown and described hereinabove. Rather the scope of the present invention is defined by the claims which follow:

We claim:

1. A method for implanting an image into a selected one at a time of a plurality of video frames representing a stream of action occurring within a background space, the space having fixed planar surfaces and being scanned by at least one video camera, the method comprising the steps of:

generating a model, independent of said plurality of video frames, of a selected one of said fixed surfaces, said model comprising a representation of geometrical features characterizing said surface; and utilizing said model for implanting said image into said frames, said step of utilizing comprising the step of perspectively distorting said model.

2. A method according to claim 1 wherein said geometrical features comprises at least one of the group consisting of lines and arcs.

3. A method according to claim 2, further comprising the step of providing an indication of the planar relationship between individual ones of said lines and arcs.

4. A method according to claim 1 wherein said representation is a planar vectorial representation.

5. Apparatus for implanting an image into a selected one at a time of a plurality of video frames representing a stream of action occurring within a background space, the space having fixed planar surfaces and being scanned by at least one video camera, comprising;

means for generating a model, independent of said plurality of video frames, of a selected one of said fixed surfaces, said model comprising a representation of geometrical features characterizing said surface; and means for utilizing said model for implanting said image into said frame, said means for utilizing comprising means for perspectively distorting said model.

6. Apparatus according to claim 5 wherein said geometrical features comprises at least one of the group consisting of lines and arcs.

7. Apparatus according to claim 6, further comprising means for providing an indication of the planar relationship between individual ones of said lines and arcs.

8. Apparatus according to claim 5 wherein said representation is a planar vectorial representation.

* * * * *